US 6,717,704 B2

United States Patent
Nakai

(10) Patent No.: US 6,717,704 B2
(45) Date of Patent: Apr. 6, 2004

(54) OPTICAL SCANNING SYSTEM

(75) Inventor: Yoko Nakai, Fuchu (JP)

(73) Assignee: Fuji Photo Optical Co., LTD, Saitama (JP)

(*) Notice: Subject to any disclaimer, the term of this patent is extended or adjusted under 35 U.S.C. 154(b) by 0 days.

(21) Appl. No.: 10/397,301

(22) Filed: Mar. 27, 2003

(65) Prior Publication Data

US 2003/0189743 A1 Oct. 9, 2003

(30) Foreign Application Priority Data

Apr. 8, 2002 (JP) ........................................ 2002-105505

(51) Int. Cl.[7] .............................................. G02B 26/08
(52) U.S. Cl. ........................ 359/204; 359/216; 359/205; 359/207; 347/243; 347/244
(58) Field of Search ................................. 359/204–207, 359/216–219; 347/233, 243–244

(56) References Cited

U.S. PATENT DOCUMENTS 4,547,038 A  10/1985  Mori
5,208,456 A   5/1993  Appel et al.
5,526,166 A   6/1996  Genovese
6,061,162 A * 5/2000  Shiraishi et al. ............ 359/204
6,313,906 B1 11/2001  Nagasaka et al.

* cited by examiner

Primary Examiner—James Phan
(74) Attorney, Agent, or Firm—Arnold International; Jon W. Henry; Bruce Y. Arnold

(57) ABSTRACT

An optical scanning system for scanning a plurality of light beams on scanned surfaces, such as photosensitive drums, includes a light source, a front optical system, a deflector (e.g., a rotating polygon mirror) that scans the light beams in a main scanning direction, and a rear optical system for directing the light beams toward the scanned surfaces so that separations of the light beams in a sub-scanning direction that is orthogonal to the main scanning direction increase due to the light beams entering the rear optical system at diverging angles. The front optical system includes a lens group that is adjacent to the deflector and is of negative refractive power at least in the second direction. The rear optical system includes cylindrical lens parts that are oppositely inclined relative to the optical axis in a plane that includes the sub-scanning direction in order to correct curvatures of the scanning lines.

20 Claims, 17 Drawing Sheets

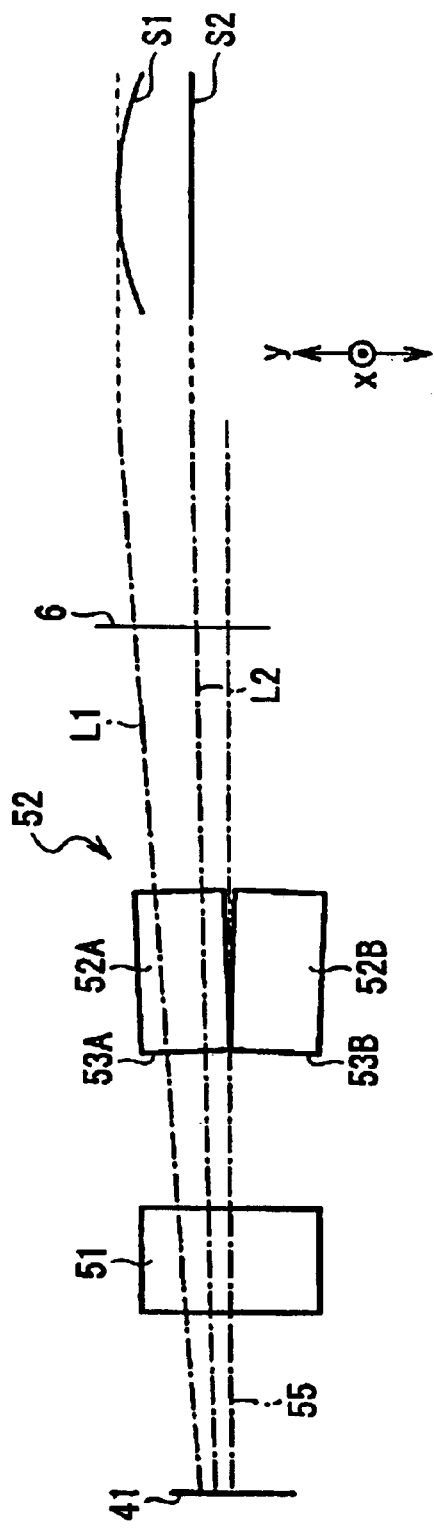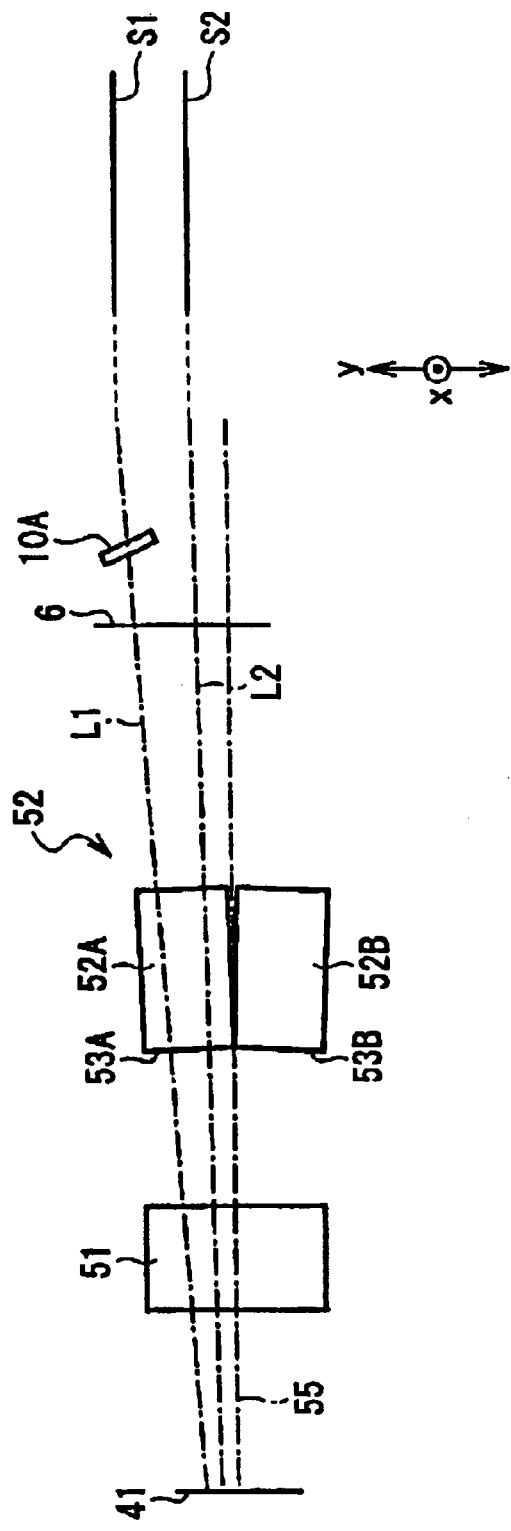
Fig. 7A
Fig. 7B

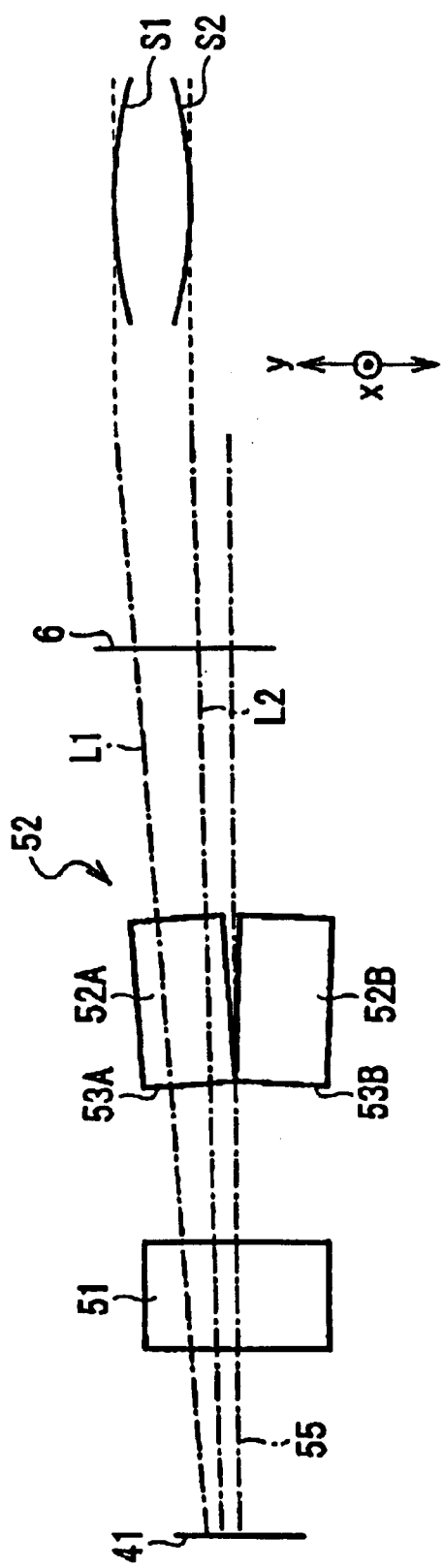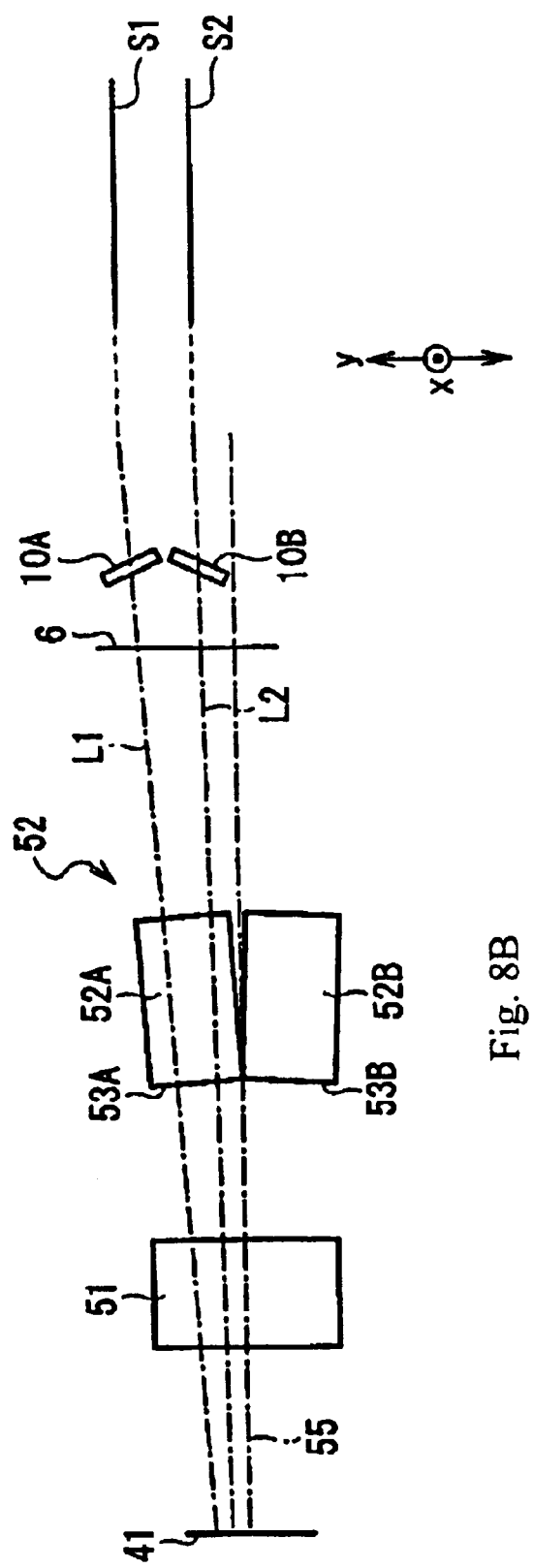

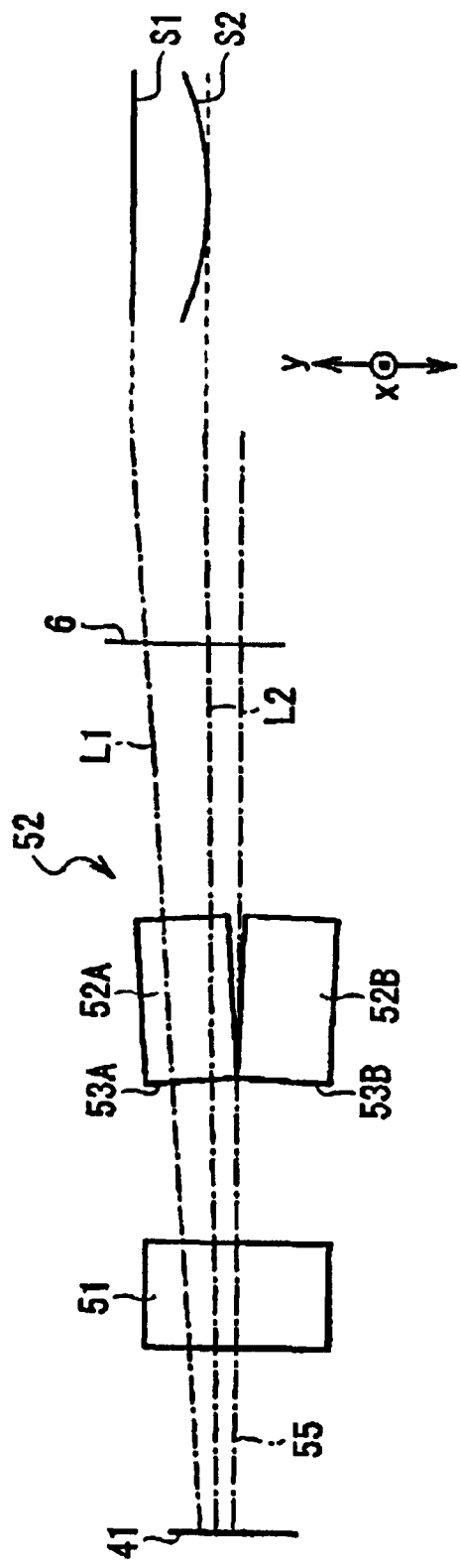
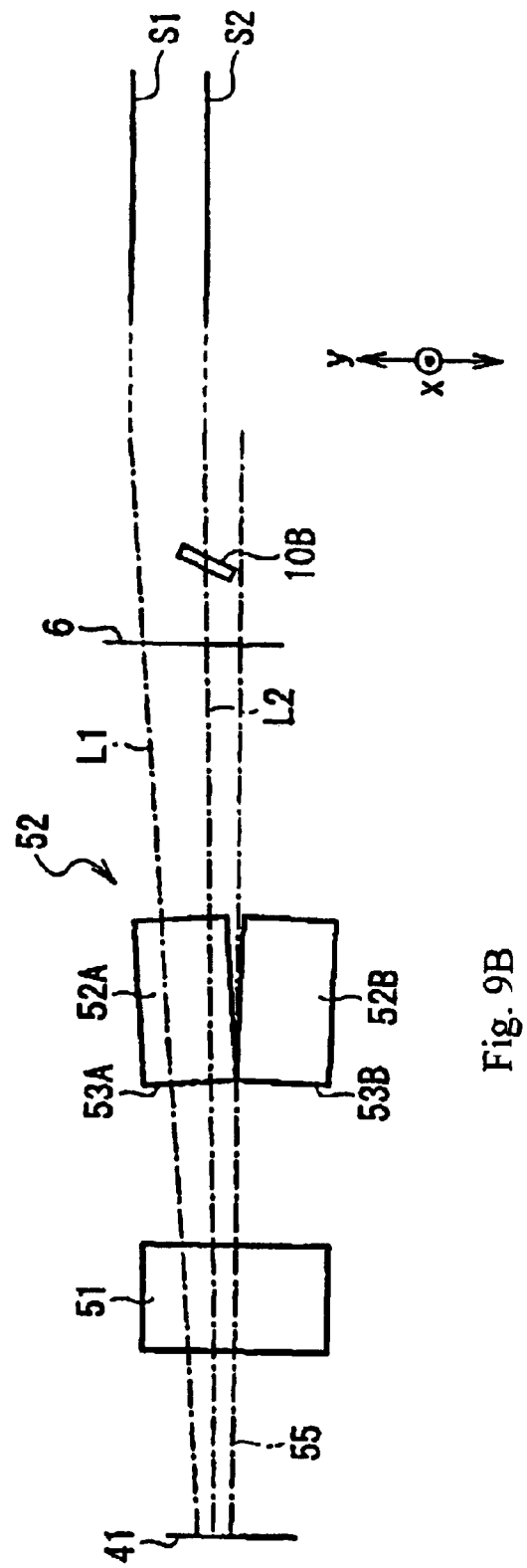
Fig. 9A
Fig. 9B

OPTICAL SCANNING SYSTEM

BACKGROUND OF THE INVENTION

Optical scanning systems are conventionally used to form images in laser beam printers and similar devices. The optical scanning system emits a light beam, conventionally a laser beam, that scans as a light spot along a scanned surface where photosensitive material is present. More precisely, the optical scanning system includes a collimator lens to collimate a light beam emitted from a light source, such as a semiconductor laser device, and then uses an optical deflector, such as a high-speed rotating polygon mirror, to deflect the collimated light beam onto a scanned surface, such as a photosensitive drum surface.

Multi-beam scanners that simultaneously use plural light beams to scan are in development for laser beam printers, including color laser printers. The multi-beam scanner uses an optical system to guide plural light beams emitted from a light source to a shared polygon mirror. The polygon mirror is rotated to reflect the plural light beams to different points on scanned surfaces. In order to guide the plural light beams to multiple scanned surfaces from a shared polygon mirror, the plural light beams have to be separated from one another. Therefore, a separation optical system, such as a splitting mirror, is provided between the polygon mirror and the scanned surfaces.

Recent demand for higher printing speed requires higher scanning speed, which, in turn, requires higher rotation rates of the polygon mirror. Thus, the polygon mirror must be made smaller and lighter. It is important that the polygon mirror have a small thickness in the sub-scanning direction that is generally parallel to the axis of rotation of the polygon mirror and orthogonal to the main scanning direction in which rotation of the polygon mirror causes the laser beams to scan.

The multi-beam scanner is structured to have plural light beams arranged in the sub-scanning direction. Consequently, the polygon mirror has a larger thickness in the sub-scanning direction than that of a single beam scanner. Therefore, the polygon mirror is heavier and less compact.

It is understood that the plurality of light beams may be spaced closer together in order to reduce the thickness of the polygon mirror in the sub-scanning direction. However, a limitation is imposed on that close spacing created by the fact that the plurality of light beams must be separable on the image side of the polygon mirror. As described above, it is difficult in conventional multi-beam scanners to give the polygon mirror a small thickness in the sub-scanning direction as required to increase printing speed.

BRIEF SUMMARY OF THE INVENTION

The present invention relates to an optical scanning system in which plural light beams are spaced to be separable on the image side of an optical deflector and the optical deflector has a small thickness in the sub-scanning direction so that high speed printing can be realized in optical scanning devices, such as laser printers.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 6A–6B, 7A–7B, 8A–8B, and 9A–9B show enlarged side views in the same direction as FIG. 2 of four alternative embodiments of an optical system of the present invention;

DETAILED DESCRIPTION

Figure 1:
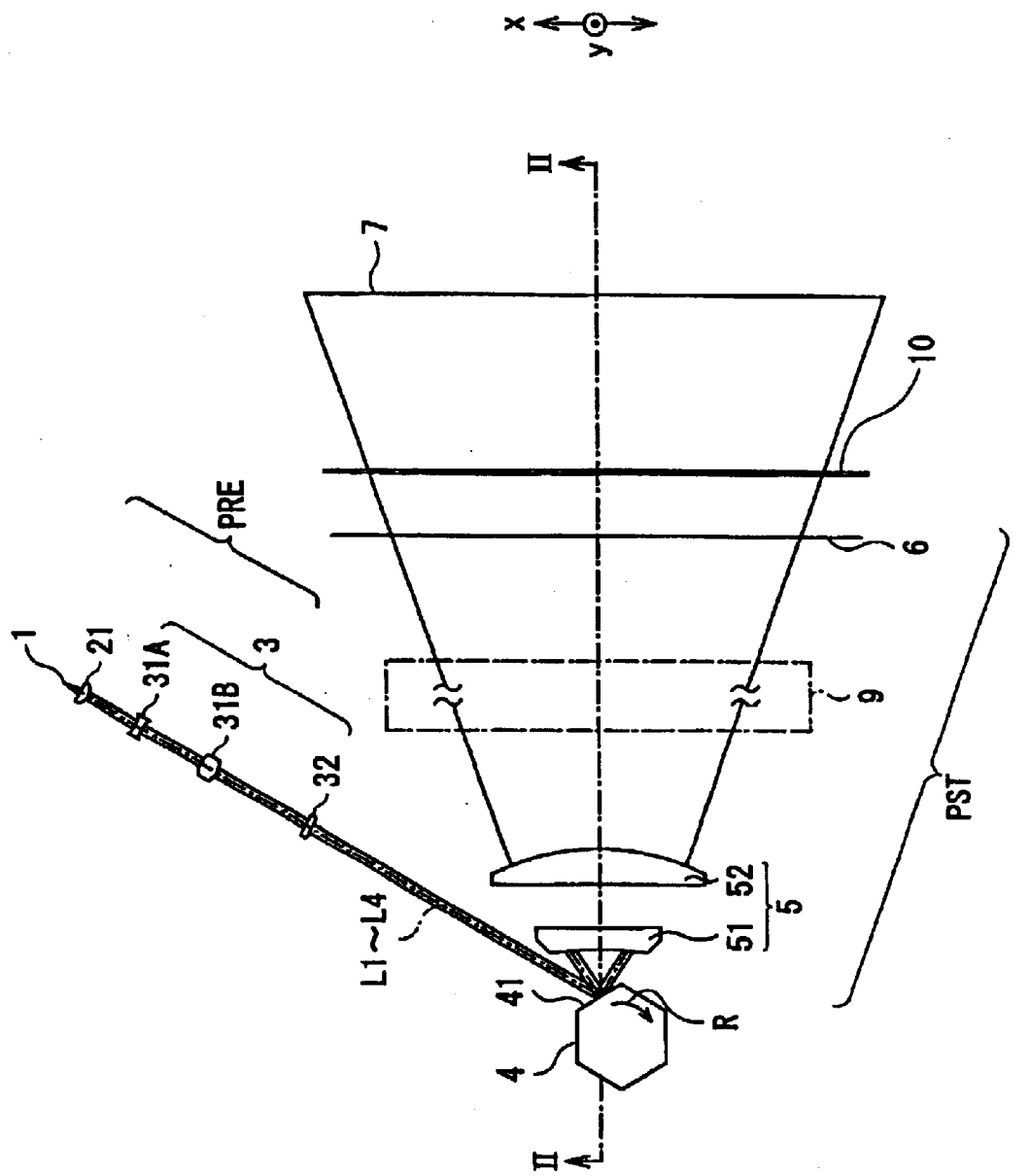
FIG. 1 shows a plan view of the basic components of the optical scanning system of a preferred embodiment of the invention in the plane that includes the main scanning direction.
Figure 2:
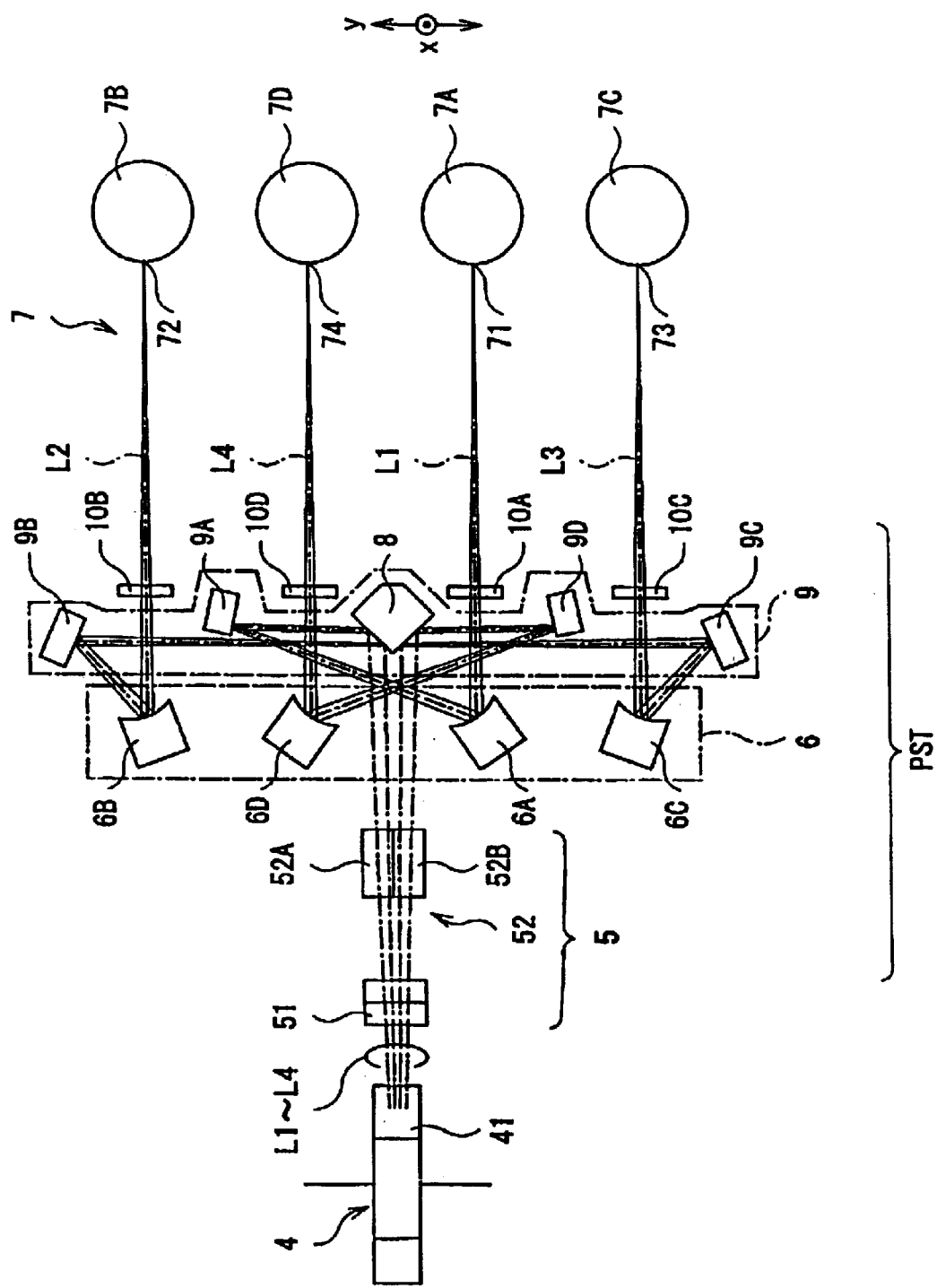
FIG. 2 shows a cross-sectional view along line II—II of FIG. 1.

The present invention will now be described in terms of preferred embodiments of the invention with reference to the attached drawings. First, a preferred embodiment will be described with reference to FIGS. 1 and 2. FIG. 1 shows a plan view of the basic components of the optical scanning system of a preferred embodiment of the invention in the plane that includes the main scanning direction. FIG. 2 shows a cross-sectional view along line II—II of FIG. 1, which is a plane that includes the sub-scanning direction.

The splitting mirror 8 and folding mirrors 9A to 9D (that will be described later) in FIG. 2 are omitted in FIG. 1 and the folded optical paths are shown as straightened in FIG. 1.

This optical scanning system can be used, for example, in a color laser printer. As shown in FIG. 1, four light beams L1 to L4 are guided to a scanned surface 7 to form light spots that move on the scanned surface 7 in a certain direction at a fixed speed for optical scanning. The direction in which the light spots move is the main scanning direction x (that defines an x-axis) and the direction orthogonal to it (orthogonal to the plane of FIG. 1) is the sub-scanning direction y (that defines a y-axis). The scanned surface 7 moves in the sub-scanning direction y.

The optical scanning system includes a light source 1 that emits plural light beams, a front optical system PRE provided in the optical path of the light beams L1 to L4 from the light source 1, a polygon mirror 4 which is used as an optical deflector that is positioned at the rear of the front optical system and shared by the light beams L1 to L4, and a rear optical system PST provided between the polygon mirror 4 and the scanned surface 7. In the description which follows, "front" refers to the light source 1 side of the polygon mirror 4 and "rear" refers to the side after reflection from the polygon mirror 4.

Figure 3A:
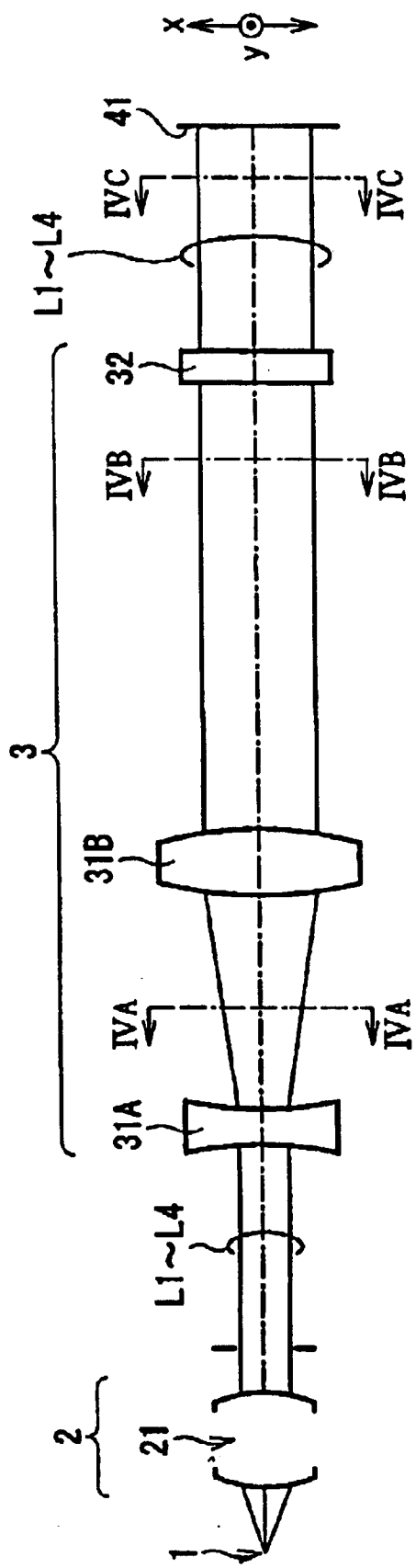
FIG. 3A shows an enlarged cross-sectional view in the main scanning direction of the front optical system of FIG. 1.
Figure 3B:
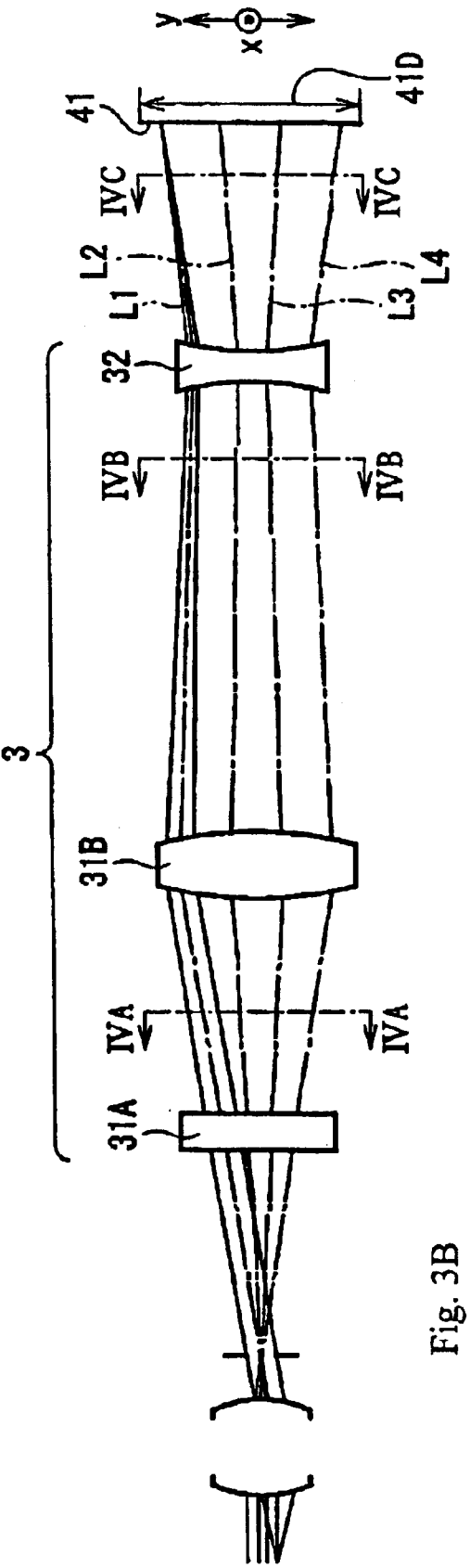
FIG. 3B shows an enlarged cross-sectional view in the sub-scanning direction of the front optical system of FIG. 1.

FIG. 3A shows an enlarged cross-sectional view of the front optical system PRE of FIG. 1 in the main scanning direction x. FIG. 3B shows an enlarged cross-sectional view of the front optical system PRE of FIG. 1 in the sub-scanning direction y. As shown in FIGS. 3A–3B, the front optical system PRE serves mainly to collimate the plural light beams from the light source 1 in one direction and control the collimated light beams in a second direction that corresponds to the sub-scanning direction so that the plural light beams are guided to the polygon mirror 4 with increasing separations. The polygon mirror 4 serves to deflect the light beams L1 to L4 from the front optical system PRE to change their direction of travel along the first direction that corresponds to the main scanning direction. The rear optical system PST serves at least to separate the light beams L1 to L4 from the polygon mirror 4 from one another in the second direction that corresponds to the sub-scanning direction before they reach the scanned surface 7.

The light source 1 of the optical scanning system includes four light sources arranged in the second direction, that is, the sub-scanning direction orthogonal to the plane of FIG. 1. The four light sources are, for example, 100 μm apart from one another. Each light source includes a semiconductor laser element and emits, for example, a light beam having a wavelength of 780 nm. The light sources are controlled by a control part (not shown in the drawings) to independently emit the light beams L1 to L4. The light beams L1 to L4 are merely exemplary light beams of the embodiment of FIG. 1.

A collimator lens group 21 is provided on the exit side of the light source 1 as a first optical system 2. The collimator lens group 21 collimates the diverging light beams L1 to L4 from the light source 1. A second optical system 3 is provided to the rear of the collimator lens group 21. The second optical system 3 includes, starting with the lens group nearer the light source 1, a first lens group having a positive refractive power in the second direction and a second lens group having a negative refractive power in the second direction. The first lens group includes, starting with the lens group nearer the light source 1, a first cylindrical lens 31A having a negative refractive power in the first direction and a spherical lens 31B having a positive refractive power. The second lens group includes a second cylindrical lens 32 having a negative refractive power in the second direction.

In the second optical system 3, the first lens group serves to maintain the four collimated light beams L1 to L4 after they pass through the collimator lens group 21 parallel and the spherical lens 31B of the first lens group and the second lens group serve to individually converge the light beams in the second direction. Here, the first lens group can be used to increase or decrease the separations of the light beams in the first direction. The function of the second optical system 3 will be further described later.

The polygon mirror 4 provided in the rear of the second optical system 3 is shared by the light beams L1 to L4. The polygon mirror 4 deflects the light beams from the second cylindrical lens 32 to change their directions of travel along the first direction, that is, along the main scanning direction. More precisely, the polygon mirror 4 is, for example, a hexagonal mirror made as a hexagonal column with six facets, each facet carrying a reflecting surface 41. The plural light beams from the second optical system 3 strike the reflecting surfaces 41 with certain separations from one another in the second direction, that is, the sub-scanning direction. The polygon mirror 4 is rotated at a fixed speed (for example 5000 to 20000 revolutions per minute) in the direction indicated by the arrow R in FIG. 1 around the rotation axis that is orthogonal to the plane of FIG. 1. The polygon mirror 4 is rotated to change the incident angles and thus the reflecting angles of the light beams L1 to L4 so as to change the directions of travel of the light beams L1 to L4 along the first direction, that is, along the main scanning direction.

The polygon mirror 4 is followed by a third optical system 5 that includes a third cylindrical lens 51 and a fourth cylindrical lens 52. The third optical system 5 serves as an f·θ lens to regulate the scanning speed on the scanned surface 7 so as to be constant. The third cylindrical lens 51 has a negative refractive power in the first direction and the fourth cylindrical lens 52 has a positive refractive power in the first direction. The third optical system 5 has an overall positive refractive power in the first direction to converge the light beams L1 to L4 from the polygon mirror 4 in the first direction, that is, in the main scanning direction.

Referring to FIG. 2, the fourth cylindrical lens 52 includes a first lens part 52A and a second lens part 52B that are adjacent to each other in the second direction. The first and second lens parts 52A and 52B are inclined at different angles corresponding to the incident angles of the light beams L1 to L4 as will be described later.

As shown in FIG. 2, the third optical system 5 is followed by a separation optical system 9 that includes a splitting mirror 8 and folding mirrors 9A to 9D. The splitting mirror 8 separates the light beams L1 and L2 from the light beams L3 and L4, which all come from the third optical system 5 spaced apart in the second or sub-scanning direction. The splitting mirror 8 is formed, for example, as a rectangular column extending in the first direction, which is orthogonal to the plane of FIG. 2, and the longitudinal direction of which is parallel to the longitudinal direction of the fourth cylindrical lens 52. Two facets of the splitting mirror 8 face the fourth cylindrical lens 52 and are orthogonal to each other to form the reflecting surfaces that are inclined by ±45° in relation to the direction in which the light beams L1 to L4 proceed, that is, the center line direction of the four light beams, after they pass through the fourth cylindrical lens 52.

The light beams L1 to L4 strike the splitting mirror 8 in a vertical row as shown in FIG. 2. As shown in FIG. 2, the top two light beams L1 and L2 are reflected upward and the light beams L3 and L4 are reflected downward. After being reflected by the splitting mirror 8, the light beam L1 strikes the folding mirror 9A and the light beam L2 strikes the folding mirror 9B. Furthermore, the light beam L3 strikes the folding mirror 9C and the light beam L4 strikes the folding mirror 9D.

The folding mirrors 9A–9D are followed by a fourth optical system that includes, for example, cylindrical mirrors 6A–6D. The fourth optical system serves to converge each of the light beams L1 to L4 from the folding mirrors 9A–9D mainly in the second direction. Here, it is preferred that the fourth optical system 6 that includes cylindrical mirrors 6A to 6D have a positive refractive power at least in the second direction. The cylindrical mirror 6A reflects the light beam L1 from the reflecting mirror 9A to converge it in the second direction and the cylindrical mirror 6B reflects the light beam L2 from the reflecting mirror 9B to converge it in the second direction. Furthermore, the cylindrical mirror 6C reflects the light beam L3 from the reflecting mirror 9C to converge it in the second direction, and the cylindrical mirror 6D reflects the light beam L4 from the reflecting mirror 9D to converge it in the second direction.

The fourth optical system 6 is followed by cover glasses 10A to 10D at positions corresponding to the cylindrical mirrors 6A to 6D, respectively. The cover glass 10A transmits the light beam L1 from the cylindrical mirror 6A to correct its scanning line curvature on the scanned surfaces 7. The cover glass 10B transmits the light beam L2 from the cylindrical mirror 6B to correct its scanning line curvature on the scanned surfaces 7. Similarly, the cover glasses 10C and 10D transmit the light beams L3 and L4 from the cylindrical mirrors 6C and 6D, respectively, to correct their scanning line curvature on the scanned surfaces 7. The scanning line curvature and correction thereof will be described later.

The cover glasses 10A–10D are followed by the scanned surfaces 7. The scanned surfaces 7 are, for example, layers of photosensitive material, such as selenium, formed on four photosensitive drums 7A to 7D which are oriented with their cylindrical axes parallel to one another. The photosensitive drums 7A to 7D include scanned surfaces 71 to 74, respectively. Each of the scanned surfaces 71 to 74 is scanned by one of the light beams L1 to L4.

The operation and effects of the optical scanning system having the above structure are described hereafter. The description begins with a brief description of the optical scanning system with reference to FIGS. 1 and 2.

Upon receipt of an image forming start command by an external device, such as a computer, the polygon mirror 4 starts rotating. Then, the photosensitive drums 7A to 7D are rotated and four light sources of the light source 1 are modulated and activated to emit the light beams L1 to L4 based on input image information. After passing through the collimator lens group 21, each of the light beams L1 to L4 is at least approximately collimated. The collimated light beams L1 to L4 are focused to line images in the second direction, the sub-scanning direction, near the reflecting surface 41 of the polygon mirror 4 by the refractive power in the second direction of the spherical lens 31B and the second cylindrical lens 32. Here, the line images are linear in the first direction, that is, the main scanning direction.

The light beams L1 to L4, reflected by the polygon mirror 4, pass through the third and fourth cylindrical lenses 51 and 52 so as to converge in the first direction. Then, they are reflected sequentially by the splitting mirror 8, reflecting mirrors 9A–9D, and cylindrical mirrors 6A–6D to form images on the scanned surfaces 71 to 74, respectively. After they form images in the second direction near the reflecting surface 41 of the polygon mirror 4, the light beams L1 to L4 proceed while diverging in the second direction. However, individually the light beams L1 to L4 converge in the second direction by the positive power of the cylindrical mirrors 6A to 6D and, finally, form circular spots on the scanned surfaces 71 to 74.

In this way, the surfaces of the photosensitive drums 7A to 7D are exposed and electrostatic latent images are formed thereon based on different color image data. Different color toners having the opposite charge to the electrostatic latent image are deposited on the image region of the photosensitive drums 7A to 7D to transfer the images to recording paper. This is followed by the fixing process in which the color images are fixed on the recording paper.

The optical effects of the optical scanning system of the preferred embodiment of FIG. 1 will now be described with reference to FIGS. 3A–3B to FIG. 10. First, the optical effects of the second optical system 3 will be compared to the comparative embodiment of FIGS. 5A–5B.

Figure 5A:
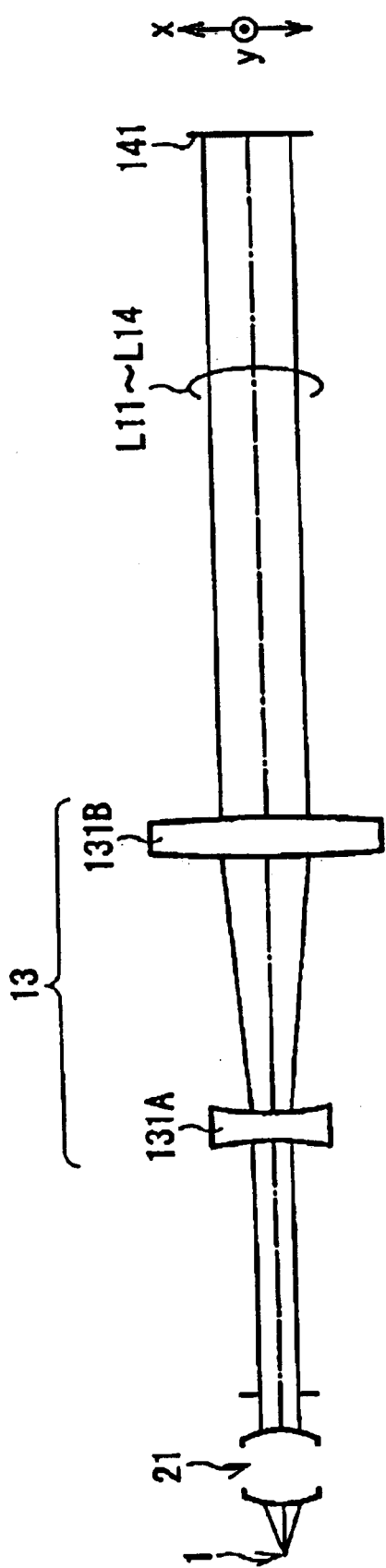
FIG. 5A shows an enlarged cross-sectional view in the main scanning direction of a comparative embodiment of a laser scanning system.
Figure 5B:
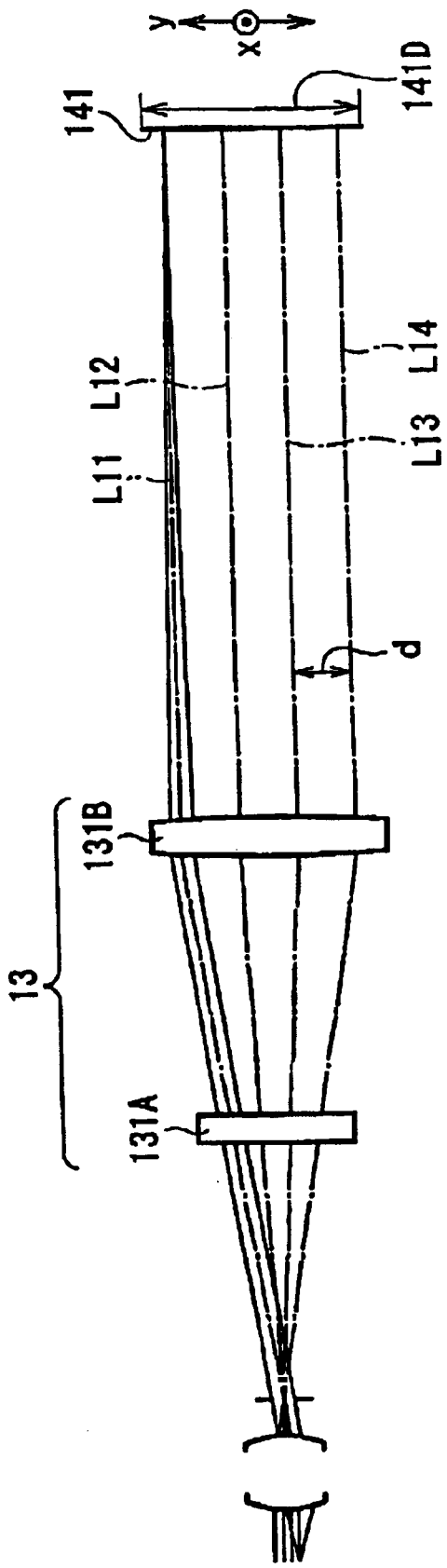
FIG. 5B shows an enlarged cross-sectional view in the sub-scanning direction of a comparative embodiment of a laser scanning system.

FIGS. 5A–5B show enlarged cross-sectional views of a second optical system of an optical scanning system that is similar to that of FIGS. 3A–3B. FIG. 3A and FIG. 5A show cross-sectional views along the main scanning direction, and FIG. 3B and FIG. 5B show cross-sectional views along the sub-scanning direction.

As shown in FIGS. 3A–3B, after being emitted from the light source 1 and passing through the collimator lens group 21, the light beams L1 to L4 sequentially pass through the first cylindrical lens 31A, the spherical lens 31B, and the second cylindrical lens 32 before they reach the polygon mirror surface 41 of the polygon mirror 4.

First, the optical effect in the first direction is described with reference to FIG. 3A. After being collimated by the collimator lens group 21, the light beams L1 to L4 enter the first cylindrical lens 31A. Here, only one light beam is shown in FIG. 3A because the light beams L1 to L4 are aligned in the second direction, which is the y-axis direction as shown in FIG. 3A, and the light beams proceed to the right as shown in FIG. 3A aligned in the second direction, as well as to the right in FIG. 3B that shows the light beams L1 to L4 vertically aligned.

The first cylindrical lens 31A has a negative refractive power in the first direction. Therefore, the light beams L1 to L4 that have passed through the first cylindrical lens 31A have increased diameters when they enter the spherical lens 31B. The spherical lens 31B has a positive refractive power. Therefore, the light beams that have exited the spherical lens 31B have increased, decreased, or maintained diameters in the first direction when they enter the second cylindrical lens 32. FIG. 3A shows an example where each of the light beams L1 to L4 is at least approximately collimated in the first direction. The second cylindrical lens 32 does not have refractive power in the first direction. Therefore, the light beams L1 to L4 pass through the second cylindrical lens 32 without being refracted in the first direction and reach the reflecting surface 41.

Now, the optical effects in the second direction will be described with reference to FIG. 3B. After being collimated by the collimator lens group 21, the light beams L1 to L4 enter the first cylindrical lens 31A. The first cylindrical lens 31A does not have refractive power in the second direction. Therefore, the light beams L1 to L4 pass through the first cylindrical lens 31A without being refracted in the second direction and reach the spherical lens 31B. The spherical lens 31B has positive refractive power. Therefore, the light beams L1 to L4 that have passed through the spherical lens 31B have reduced diameters in the second direction with their separations increased, decreased, or maintained the same when they enter the second cylindrical lens 32. FIG. 3B shows an example where their separations are decreased.

The second cylindrical lens 32 has negative refractive power in the second direction. Therefore, the light beams L1 to L4 proceed to the reflecting surface 41 with their separations progressively increasing from the second cylindrical lens 32 to the reflecting surface 41 of the polygon mirror 4. The second cylindrical lens 32 having negative refractive power tends to increase the diameters of the light beams L1 to L4 in the second direction. However, the preceding spherical lens 31B has positive refractive power that is stronger than the negative refractive power of the second cylindrical lens 32. Consequently, the light beams continuously decrease in diameter after they pass through the second cylindrical lens 32 and form line images in the second direction near the reflecting surface 41. After they form line images in the second direction near the reflecting surface 41 of the polygon mirror 4, the light beams L1 to L4 are reflected by the reflecting surface 41 and enter the rear optical system PST, as shown in FIG. 1, with their separations in the second direction continuing to increase.

Figure 4:
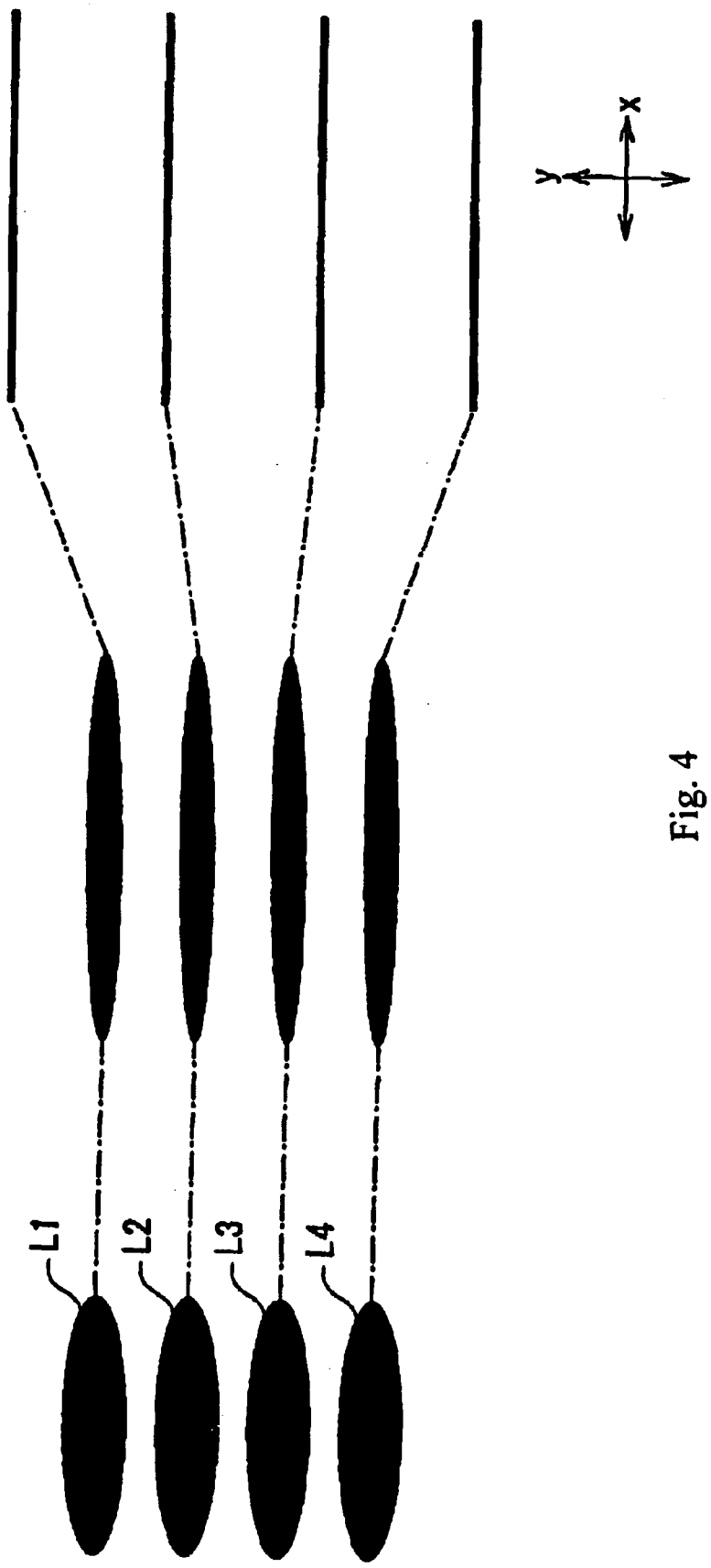
FIG. 4 shows the light beams of FIG. 1 as seen in enlarged cross-sectional views along the lines IVA—IVA, IVB—IVB, and IVC—IVC of FIGS. 3A–3B.

FIG. 4 shows the light beams of FIG. 1 in enlarged cross-sectional views along the lines IVA—IVA (left column), IVB—IVB (middle column), and IVC—IVC (right column) of FIGS. 3A and 3B. The cross-sectional views are in the direction orthogonal to the directions of travel of the light beams L1 to L4 while they pass through the second optical system 3. The left column of FIG. 4 shows the cross-sectional view of the light beams L1 to L4 at the line IVA—IVA in FIGS. 3A–3B between the first cylindrical lens 31A and the spherical lens 31B. The first cylindrical lens 31A has refractive power only in the first direction. Therefore, the cross-sections of the light beams L1 to L4 shown in the left column of FIG. 4 are extended in the first direction, the main scanning or x-axis direction, but not in the second direction, the sub-scanning y-axis direction, as they approach the spherical lens 31B.

The center column of FIG. 4 shows the cross-sectional views of the light beams L1 to L4 at the line IVB—IVB in FIGS. 3A–3B that is immediately before the second cylindrical lens 32. After passing through the spherical lens 31B, the cross-sections of the light beams L1 to L4 shown in the center column of FIG. 4 are reduced in the y-axis direction and the separations of the light beams L1 to L4 become smaller as they approach the second cylindrical lens 32. Comparing the left column versus the center column of FIG. 4, the expansion in the x-axis direction and the reduction in the y-axis direction of the cross-sections of light beams L1 to L4 is evident.

The right column of FIG. 4 shows a cross-sectional view of the light beams L1 to L4 at the line IVC—IVC in FIGS. 3A–3B that is immediately before the reflecting surface 41 of the polygon mirror 4. After passing through the second cylindrical lens 32, the light beams L1 to L4 are individually converged in the second direction so as to have a linear cross-section. At the same time, the light beams L1 to L4 have larger separations in the second (y-axis) direction. After being reflected by the reflecting surface 41, the light beams L1 to L4 proceed with their separations progressively increasing to an extent that they are separable by the splitting mirror 8.

FIGS. 5A–5B show an embodiment of an optical scanning system for comparison to the optical scanning system shown in FIGS. 3A–3B. As shown in FIG. 5A, after being collimated in the plane including the first direction by the collimator lens group 21, the light beams L11 to L14 enter the first cylindrical lens 131A. The first cylindrical lens 131A has negative refractive power in the first direction. Therefore, the light beams L11 to L14 that have passed through the first cylindrical lens 131A increase their diameters before they enter the spherical lens 131B. The spherical lens 131B has positive refractive power. The light beams L11 to L14 that have exited the spherical lens 131B maintain or reduce their diameters before they enter the reflecting surface 141. Here, FIG. 5A shows an example in which their diameters remain equal.

As shown in FIG. 5B, after being collimated in the plane including the second direction by the collimator lens group 21, the light beams L11 to L14 enter the first cylindrical lens 131A. The first cylindrical lens 131A does not have refractive power in the second direction. Therefore, the light beams L11 to L14 pass through the first cylindrical lens 131A without being refracted in the second direction and enter the spherical lens 131B. The spherical lens 131B has positive refractive power. Therefore, the light beams L11 to L14 that have exited the spherical lens 131B are reduced in diameter before they strike the reflecting surface 141. Then, the light beams L11 to L14 strike the reflecting surface 141 at a right angle with their separations unchanged, having been maintained parallel between the spherical lens 131B and the reflecting surface 141, which helps avoid the scanning lines formed on the scanned surface 7 from being curved. The light beams L11 to L14 reflected by the reflecting surface 141 maintain the same separations as they enter the separation optical system that follows reflecting surface 141.

In this comparative embodiment of FIGS. 5A–5B, the separations of the light beams L11 to L14 are determined so that they are separable by the following separation optical system. Assuming that d is the minimum distance for which the separation optical system is able to separate the light beams, d is also the acceptable minimum separation of the light beams L11 to L14 at the reflecting surface 141. Accordingly, the reflecting surface 141 has to have a width 141D of three times d or larger in the second direction.

The comparative embodiment of FIGS. 5A–5A requires that the light beams be parallel to one another after they pass through the spherical lens 131B as shown in FIG. 5B. Therefore, the refractive power of the spherical lens 131B in the second direction is limited to some extent. This results in moving the image positions of the light beams in the second direction away from the spherical lens 131B, thus extending the distance between the light source 1 and the reflecting surface 141 of the polygon mirror 4.

In contrast, the optical scanning system of the embodiment of the present invention shown in FIGS. 3A–3B uses the second optical system 3 in which the spherical lens 31B having large positive refractive power converges the light beams L1 to L4 toward one another in the second direction with reduced separations, and then the second cylindrical lens 32, which is provided immediately before the polygon mirror 4, serves to slightly increase the separations of the light beams in the second direction, as shown in FIG. 3B. This allows the light beams L1 to L4 in the preferred embodiment of FIGS. 3A–3B to have separations on the reflecting surface 41 of the polygon mirror 4 that are smaller than the separations d.

In the preferred embodiment of FIGS. 3A–3B, the light beams L1 to L4 reflected by the reflecting surface 41 of the polygon mirror 4 proceed to the following separation optical system with their separations progressively increasing in the second direction. Therefore, the light beams L1 to L4 may have separations larger than the acceptable distance d when they enter the separation optical system although they have separations that are smaller than the acceptable distance d at the reflecting surface 41 of the polygon mirror 4. As a result, the embodiment of FIGS. 3A–3B of the present invention allows the reflecting surface 41 to have an acceptable width 41D in the second direction that is smaller than the acceptable width 141D equal to three times d in the comparative embodiment of FIGS. 5A and 5B. Thus, the polygon mirror 4 can have a smaller thickness in the second direction.

The optical scanning system of FIGS. 3A and 3B allows the spherical lens 31B to have a substantially larger positive refractive power than the spherical lens 131B of the comparative embodiment of FIGS. 5A and 5B. This results in moving the image points in the second direction toward the spherical lens 31B, thus reducing the distance between the light source 1 and the reflecting surface 41 of the polygon mirror 4.

The embodiment of the present invention uses the spherical lens 31B that serves to both increase, decrease, or maintain the diameters in the first direction of the light beams L1–L4 and to individually converge the light beams L1–L4 to reduce their diameters in the second direction. This reduces the number of parts in the second optical system 3. Furthermore, with the embodiment of the present invention, the first lens group of the second optical system 3 includes a first cylindrical lens 31A having negative refractive power in the first direction and the spherical lens 31B having positive refractive power. This combination reduces the optical path length compared to an afocal system where a combination of lenses, each having a positive refractive power, is used.

Figure 6A:
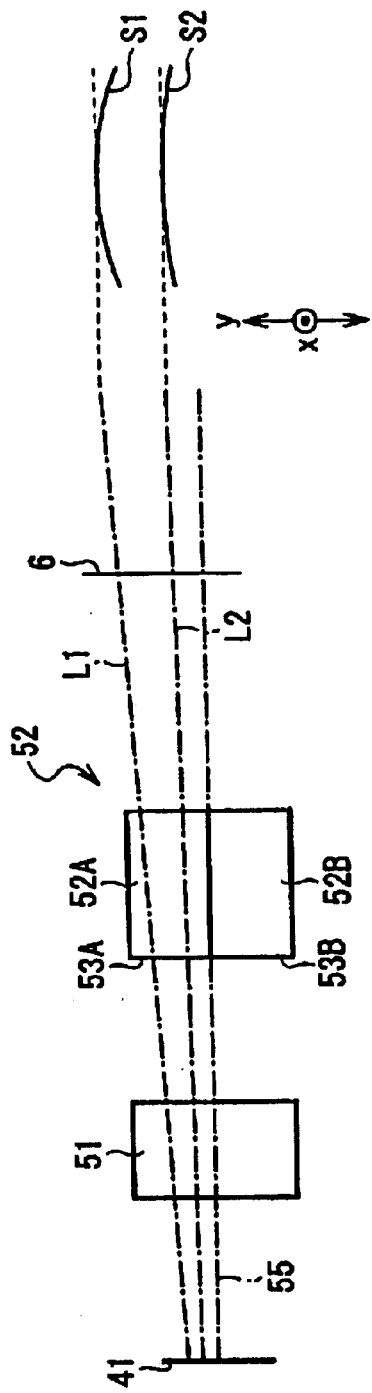
Figure 6B:
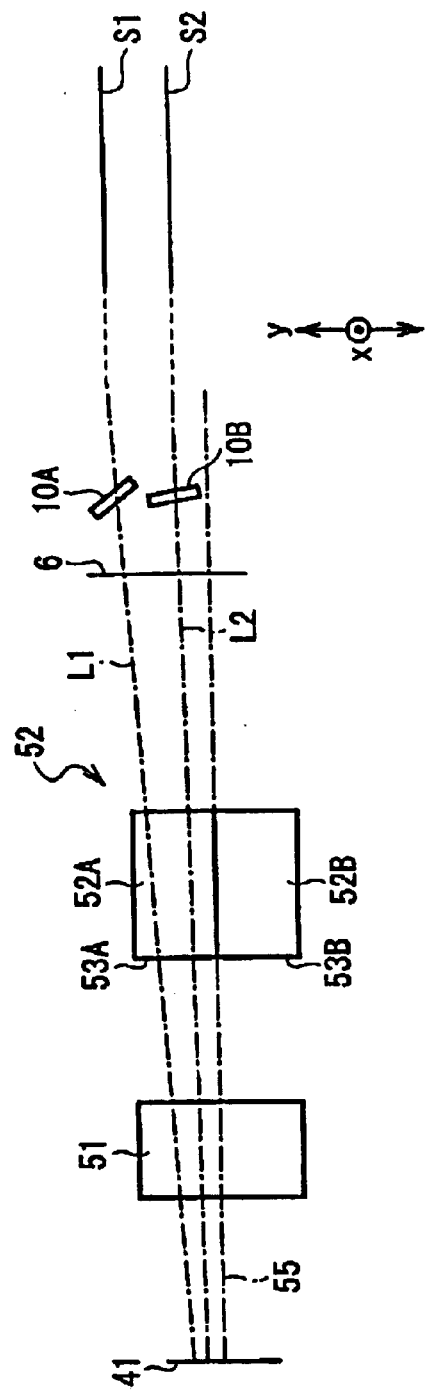

The optical effects of the third optical system 5 will now be described with reference to FIGS. 6A–6B to FIG. 13. FIGS. 6A–6B, 7A–7B, 8A–8B, and 9A–9B show enlarged side views in the same direction as FIG. 2 of four alternative embodiments of the third optical system 5. The second direction is the vertical direction as shown in these figures.

FIGS. 6A and 6B show an embodiment where the lens parts 52A and 52B that form the fourth cylindrical lens 52 of the third optical system 5 are not inclined relative to the optical axis. FIGS. 7A–7B, 8A–8B, and 9A–9B show embodiments where the lens parts 52A and 52B progressively increase in their inclination angles from the optical axis. Furthermore, FIGS. 6A, 7A, 8A, and 9A show the state before the scanning line curvature is corrected and FIGS. 6B, 7B, 8B, and 9B show the state after the scanning line curvature is corrected. In the figures, the scanning lines S1 and S2 on the scanned surface 7 are shown beside the light beams L1 and L2. In the figures, only ray tracings related to the top two light beams L1 and L2 are shown, and ray tracings related to the bottom two light beams L3 and L4 are omitted. The figures also neglect the refraction of the light rays as they pass through the cylindrical lenses 51 and 52.

Figures 10A, 10B:
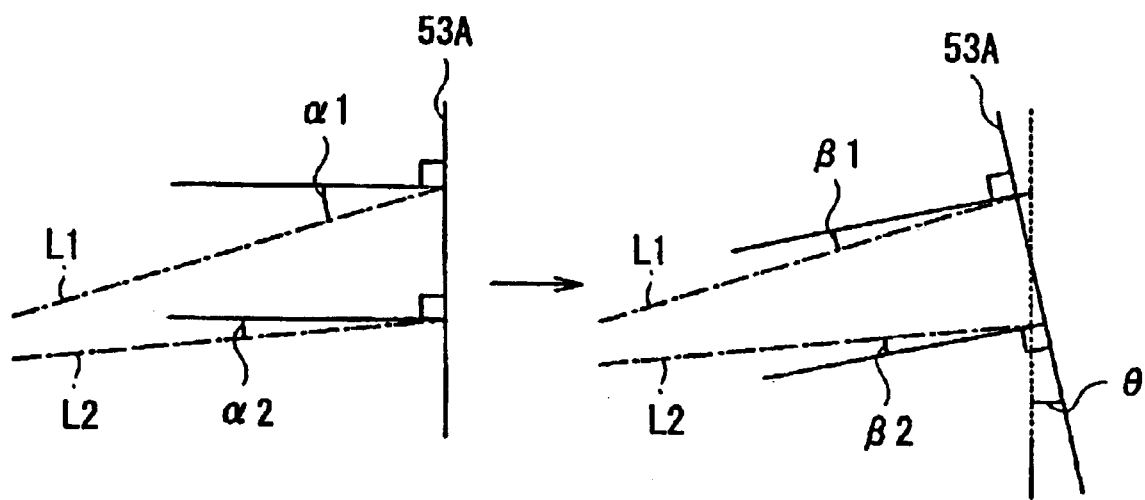
FIG. 10A shows a simplified enlarged view of the light incident surface of a lens part shown in FIG. 6A.
FIG. 10B shows a simplified enlarged view of a portion of the light incident surface of a lens part corresponding to light incidence surfaces shown in FIGS. 7A, 8A, and 9A.

FIG. 10A shows a simplified enlarged view of the light incident surface of a lens part shown in FIG. 6A. FIG. 10B shows a simplified enlarged view of a light incident surface of a lens part corresponding to light incidence surfaces shown in FIGS. 7A, 8A, and 9A.

FIGS. 6A, 7A, 8A, 9A, and 10A show the light beams L1 and L2 from the reflecting surface 41 entering the third and fourth cylindrical lenses 51 and 52 obliquely with their separations increasing. The third and fourth cylindrical lenses 51 and 52 do not have refractive power in the second direction. The light beams L1 and L2 that enter the cylindrical lenses obliquely are refracted at angles according to the refractive powers of the cylindrical lenses and exit the cylindrical lenses without their direction being altered in the plane of the figures. Here, it is assumed that the incident angles of the light beams L1 and L2 to the fourth cylindrical lens 52 at the center in the first direction, that is, the angles in relation to the surface normal of the incident surface 53A, are α1 and α2, respectively.

The light beams L1 and L2 passing through the fourth cylindrical lens 52 are skew beams except for the light beam that passes through the center in the first direction of the cylindrical lens 52. The degree of skew varies depending on the incident point. Specifically, the light beams that pass through the fourth cylindrical lens 52 near the center in the first direction have less skew and the light beams that pass through it near the periphery in the first direction have more skew. In addition, the amount of skew increases when the incident angles α1 and α2 in the second direction are larger in absolute value. The skew of the light beams results in distortion in the light spots scanned on the scanned surface 7, as will be described later.

As shown in FIG. 10A, $|\alpha 1|>|\alpha 2|$. In particular, the light beam L1 produces a more distorted spot because α1 is larger than α2. In the example of FIG. 6A, the resultant scanning lines S1 and S2 on the scanned surface 7 are raised in the middle. Here, the scanning line S1 is more curved than the scanning line S2 because α1 is larger than α2. This will be further explained later.

On the other hand, in the examples of FIGS. 7A, 8A, 9A, and 10B, the first lens part 52A is inclined by an angle θ and the second lens part 52B is inclined by an angle −θ. The angle θ is progressively increased in FIGS. 7A, 8A, and 9A, in that order. The angle θ is determined so as to lead to the linear scanning line S2 in FIG. 7A. The increased angle θ leads to the scanning lines S1 and S2 that are curved oppositely in direction but equally in magnitude, as shown in FIG. 8A. A further increased angle θ leads to the linear scanning line S1 in FIG. 9A. The relationship between the inclination angle θ and the scanning line curvature will be described in detail later.

As shown in FIG. 10B, it is assumed that the incident angles of the first and second light beams L1 and L2 in the incident plane including the second direction, that is, the angles between the light beams L1 and L2 and the normal line to the incident surface 53A of the first lens part 52A are β1 and β2, respectively, when the first lens part 52A is inclined by an angle θ. Preferably, the first lens part 52A is inclined so that the absolute value total $|\beta 1|+|\beta 2|$ of the incident angles of the first and second light beams L1 and L2 is smaller than the absolute value total $|\alpha 1|+|\alpha 2|$ of the incident angles where the first lens part 52A is not inclined. In other words, the inclination angle θ is preferably determined to satisfy the following condition:

$$|\beta 1|+|\beta 2|<|\alpha 1|+|\alpha 2| \qquad \text{Condition (1)}$$

Thus, the inclination angle θ should satisfy the following condition:

$$|\alpha 2| \leq |\theta| \leq |\alpha 1| \qquad \text{Condition (2)}$$

Similarly, it is assumed that the incident angles of the third and fourth light beams L3 and L4 in the incident plane including the second direction, that is, the angles between the light beams L3 and L4 and the normal line to the incident surface 53B of the second lens part 52B, respectively, are β3 and β4 when the second lens part 52B is inclined by an angle −θ. It is preferred that the second lens part 52B is inclined in a manner that the absolute value total |β3|+|β4| of the incident angles of the third and fourth light beams L3 and L4 is smaller than the absolute value total |α3|+|α4| of the incident angles where the second lens part 52B is not inclined. In other words, the inclination angle −θ is preferably determined to satisfy the following condition:

$$|\beta 3|+|\beta 4|<|\alpha 3|+|\alpha 4| \quad \text{Condition (3)}$$

Thus, the inclination angle −θ should satisfy the following condition:

$$|\alpha 3| \leq |-\theta| \leq |\alpha 4| \quad \text{Condition (4)}$$

With the first and second lens parts 52A and 52B inclined by the angles described above, the distortion in the shapes of the light spots formed by the light beams L1 to L4 on the scanned surface 7 is reduced. Both light beams L1 and L2 produce light spots with less distortion in FIG. 7A than in FIG. 6A, but particularly the light beam L2 has much less distortion in FIG. 7A. The light beams L1 and L2 produce similarly distorted light spots in FIG. 8A. The light beam L1 particularly produces a light spot with much less distortion in FIG. 9A. The light beams L3 and L4 produce similar light spots to those of the light beams L1 and L2.

Figure 11C:
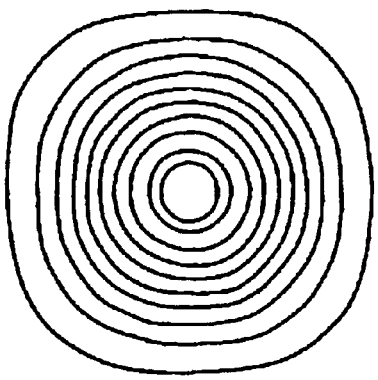
FIGS. 11A–11F are intensity contour maps of different light spots at the scanned plane with the optical system embodiment of FIG. 6A.
Figure 11F:
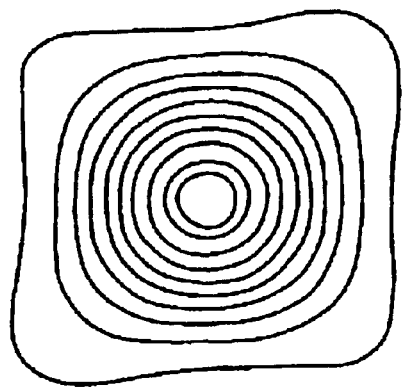
Figure 11B:
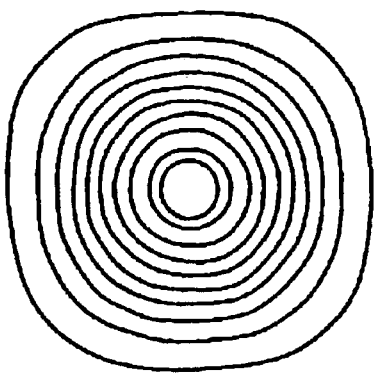
Figure 11E:
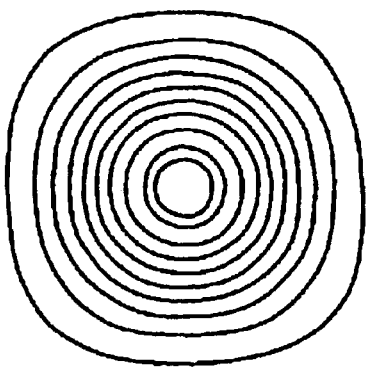
Figure 11A:
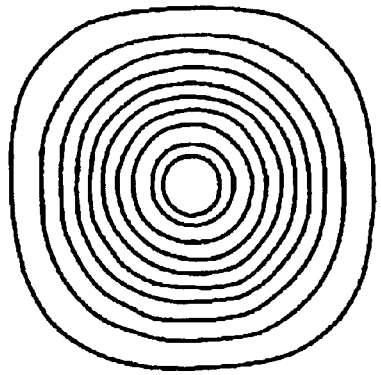
Figure 11D:
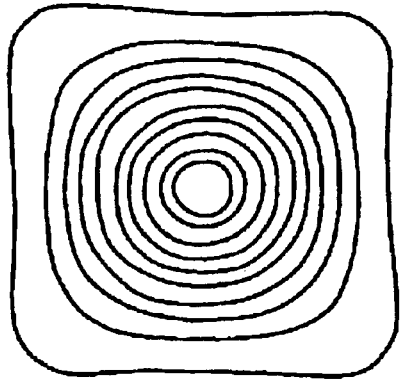

FIGS. 11A–11F are intensity contour maps of different light spots, related to different light beams, at the scanned surface 7 with the optical system embodiment of FIG. 6A where the first lens part 52A is inclined at zero degrees from the optical axis, that is, it is not inclined relative to the optical axis. FIGS. 12A–12F are intensity contour maps of different light spots, related to different light beams and corresponding to the optical systems of the type in FIGS. 7A–7B, 8A–8B, and 9A–9B, at the scanned surface 7 where the first lens part 52A is inclined at 1.0°. FIGS. 11A–11C show the case in which the incident angle is 0.5°. FIGS. 11D–11F show the case in which the incident angle is 1.5°. FIGS. 11B and 11E and FIGS. 12B and 12E show the light intensities in contour within the light spot produced by the light beam that passes through the fourth cylindrical lens 52 at the center in the first direction. FIGS. 11A, 11C, 11D, and 11F and FIGS. 12A, 12C, 12D, and 12F show the light intensities in contour within the light spots produced by the light beams that pass through the fourth cylindrical lens 52 at either periphery in the first direction.

When the first lens part 52A is not inclined, as shown in FIGS. 11A–11F, the light intensities in contour within the light spots produced by the light beams that pass through the fourth cylindrical lens 52 at the center in the first direction show no differences between the incident angels of 0.5° (FIG. 11B) and 1.5° (FIG. 11E). No significant distortion is observed. On the other hand, the light intensities in contour within the light spots produced by the light beams that pass through either periphery show more distortion with the incident angle of 1.5° (FIGS. 11D and 11F) than with the incident angle of 0.5° (FIGS. 11A and 11C).

Figure 12C:
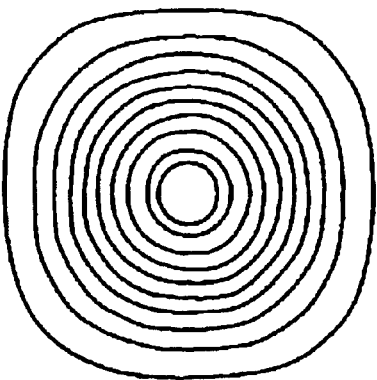
FIGS. 12A–12F are intensity contour maps of different light spots at the scanned plane corresponding to the optical systems of the types shown in FIGS. 7A–7B, 8A–8B, and 9A–9B.
Figure 12F:
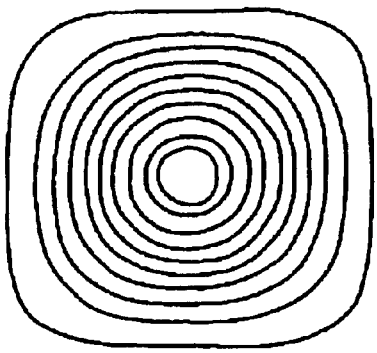
Figure 12B:
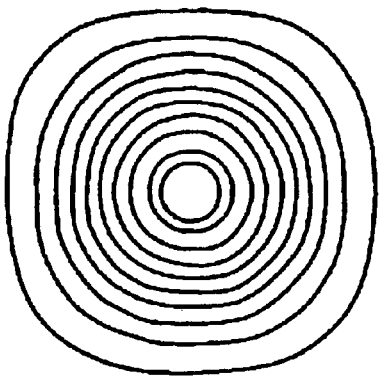
Figure 12E:
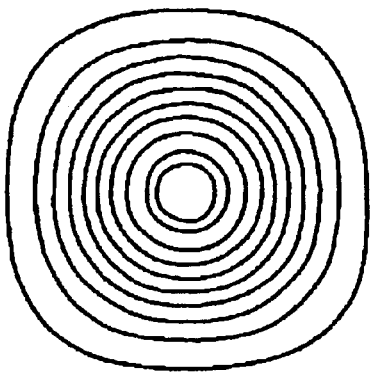
Figure 12A:
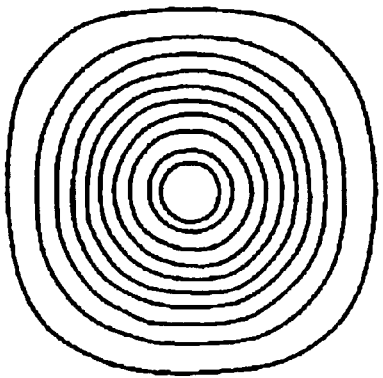
Figure 12D:
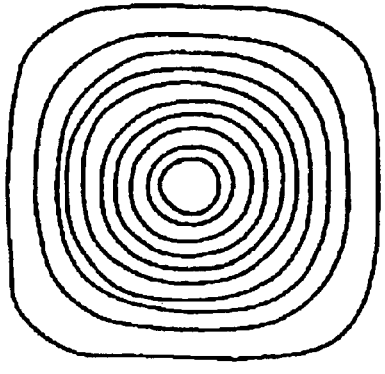

When the first lens part 52A is inclined by 1.0°, as shown in FIGS. 12A–12F, the light intensities in contour within the light spots produced by the light beams that pass through the fourth cylindrical lens 52 at either periphery in the first direction show less distortion than those of FIGS. 11A–11F. The light intensities in contour within the light spots are less distorted in FIGS. 12D and 12F compared with those in FIGS. 11D and 11F. The light intensities in contour within the light spots produced by the light beams that pass through the fourth cylindrical lens 52 at the center in the first direction show no differences between the incident angles 0.5° (FIG. 12B) and 1.5° (FIG. 12E). No significant distortions are observed.

According to the results above, it can be seen that with the first lens part 52A of the fourth cylindrical lens 52 being inclined relative to the optical axis, the light spots produced by the light beams L1 and L2 on the scanned surface 7, particularly the light spots produced by the light beams that pass through the fourth cylindrical lens 52 at either periphery, are significantly improved in shape. Similarly, with the second lens part 52B being inclined, the light spots produced by the light beams L3 and L4 on the scanned surface 7, particularly the light spots produced by the light beams that pass through the fourth cylindrical lens 52 at either periphery, are significantly improved in shape.

The scanning line curvatures that occur mainly while the light beams pass through the third optical system 5 and the correction of those curvatures will now be described. First, the reason why the scanning line curvatures occur will be described with reference to FIGS. 6A and 9A and FIGS. 13 and 14. FIGS. 13 and 14 show perspective views of the fourth cylindrical lens 52 and the cylindrical mirror 6A, respectively, with ray tracings to show how they create curved line images. Specifically, FIGS. 13 and 14 show how scanning line curvatures occur on scanned surfaces 71 to 74 (FIG. 2) after the light beams L1 to L4 pass through the fourth cylindrical lens 52 and after they are reflected by the cylindrical mirror 6A, (which is representative of cylindrical mirrors 6A–6D as shown in FIG. 2), that constitute a fourth optical system 6. The third cylindrical lens 51, separation optical system 9, and cover glasses 10A to 10D are omitted in FIGS. 13 and 14.

Figure 13:
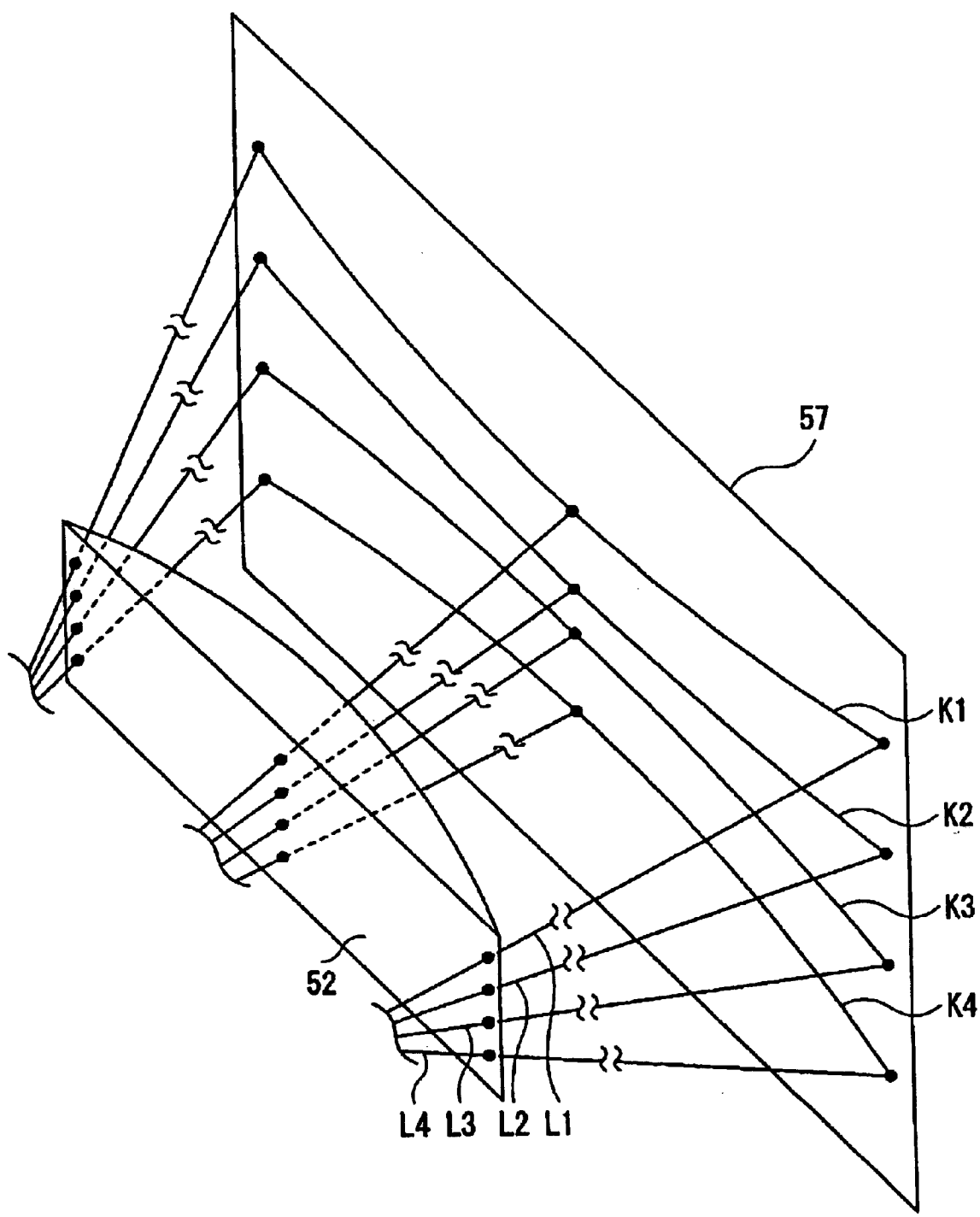
FIG. 13 shows a perspective view of a cylindrical lens of FIG. 2 with ray tracings to show how it creates a curved line image.
Figure 14:
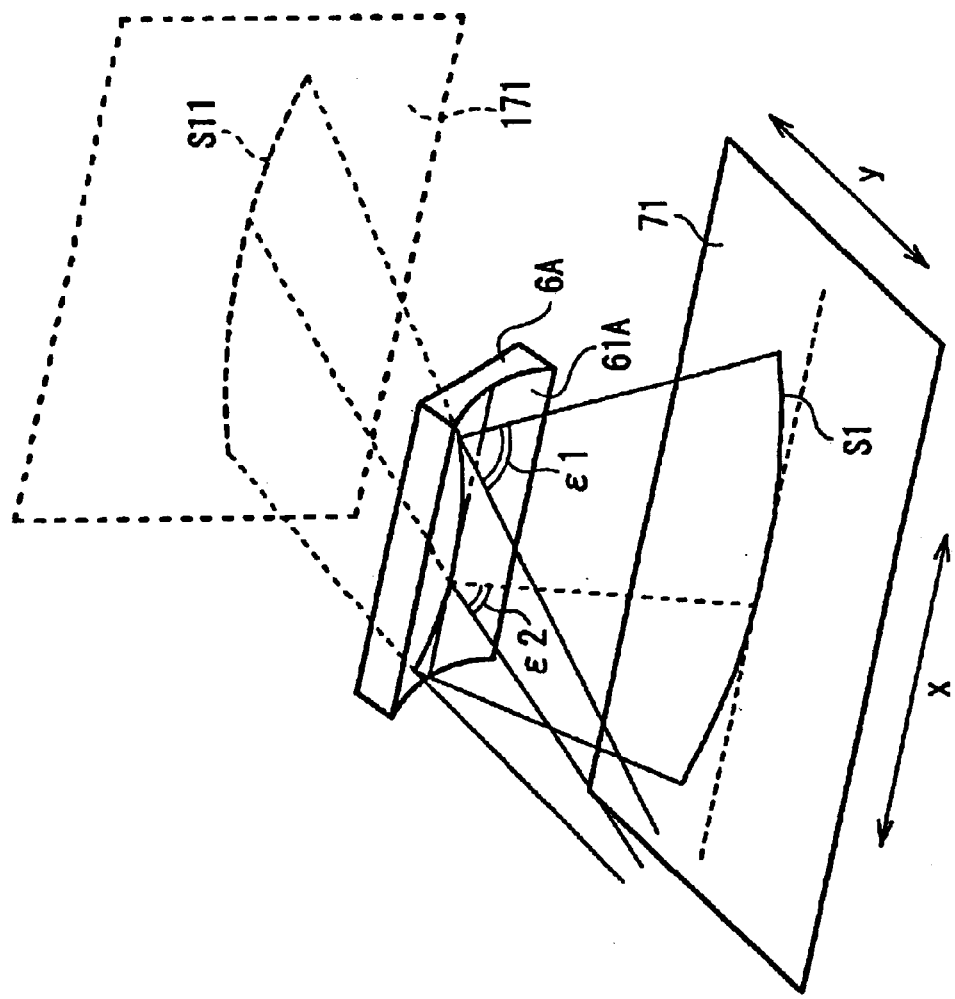
FIG. 14 shows a perspective view of a cylindrical mirror of FIG. 2 with ray tracings to show how it creates a curved line image.

As shown in FIG. 13, scanning line curvatures occur while the light beams L1 to L4 pass through the fourth cylindrical lens 52. FIG. 13 shows the scanning line curvatures on an imaginary surface 57 that occur immediately after the light beams L1 to L4 pass through the fourth cylindrical lens 52. From the cylindrical lens 51, the light beams L1 to L4 proceed to enter the fourth cylindrical lens 52 with their separations increased in the plane including the second direction. None of the light beams L1 to L4 is parallel to the center optical axis 55 (FIGS. 6A and 6B) of the third optical system 5 in the plane including the second direction. Therefore, none of the light beams L1 to L4 enter the fourth cylindrical lens 52 at a right angle to this plane. That is, the light beams L1 to L4 always enter the fourth cylindrical lens 52 obliquely.

The incident points of the light beams L1 to L4, that is, the points at which the light beams enter the fourth cylindrical lens 52, vary not only in the direction along the center optical axis but also in height in the second direction, depending on where in the first direction, at the center or at the periphery of the fourth cylindrical lens 52, the light beams L1 to L4 pass through the fourth cylindrical lens 52. The top two light beams L1 and L2 enter the fourth cylindrical lens 52 at higher points at the periphery than at the center in the first direction. As a result, the scanning lines produced by the light beams L1 and L2 on the imaginary surface 57 are lowered in the center, as shown by scanning lanes K1 and K2 in FIG. 13.

The scanning line curvature that occurs while the light beams L1 to L4 pass through the fourth cylindrical lens 52 and separation optical system 9 and are reflected by the cylindrical mirrors 6A to 6D before they reach the scanning surface 7 is further described with reference to FIGS. 6A and 14. FIG. 14 shows the light beam and the cylindrical mirror 6A that reflects the light beam. As shown in FIG. 14, the light beam proceeding upward enters the cylindrical mirror 6A at a higher point at the periphery of the cylindrical mirror 6A than at the center in the first direction. The cylindrical mirror 6A is inclined in a plane including the second direction in relation to the light beam. The light beam has an incident angle of ($\epsilon$1)/2 at the periphery, which is larger than the incident angle ($\epsilon$2)/2 at the center. The reflected light beam produces the scanning line S1 that is raised in the center on the scanned surface 71. A virtual image of the scanning line S1 is shown as scanning line S11 symmetrically extended in relation to the mirror surface 61A of the cylindrical mirror 6A in FIG. 14 for easy understanding. The scanning line S11 is produced on the scanned surface 171 that corresponds to the scanned surface 71. The scanning line S11 has the opposite curvature to the scanning line K1 (FIG. 13) that is produced immediately after the fourth cylindrical lens 52. Accordingly, the scanning line S1 on the scanned surface 71 has an opposite curvature to the scanning line K1 produced immediately after the fourth cylindrical lens 52. The scanning line S2 of the light beam L2 has the same scanning line curvature as the scanning line S1.

In this case, the incident angle $\alpha$1 of the light beam L1 is larger than the incident angle $\alpha$2 of the light beam L2 in the plane including the second direction. Therefore, the light beam L1 has a greater difference in height of incidence between the center and at the periphery of the fourth cylindrical lens 52 than does the light beam L2. As shown in FIG. 6A, the scanning line S1 of the light beam L1 is more curved than the scanning line S2 of the light beam L2. This is also true for the bottom two light beams L3 and L4 that produce scanning lines that are symmetrically similar to the top two light beams L1 and L2 in relation to the center optical axis 55.

As shown in FIG. 6A, the light beams L1 and L2 eventually produce the scanning lines S1 and S2 that are curved in the sub-scanning direction on the scanned surface 7 after they pass through the fourth cylindrical lens 52 and are reflected by the cylindrical mirrors 6A and 6B (shown as 6 in FIG. 6A).

Figure 15A:
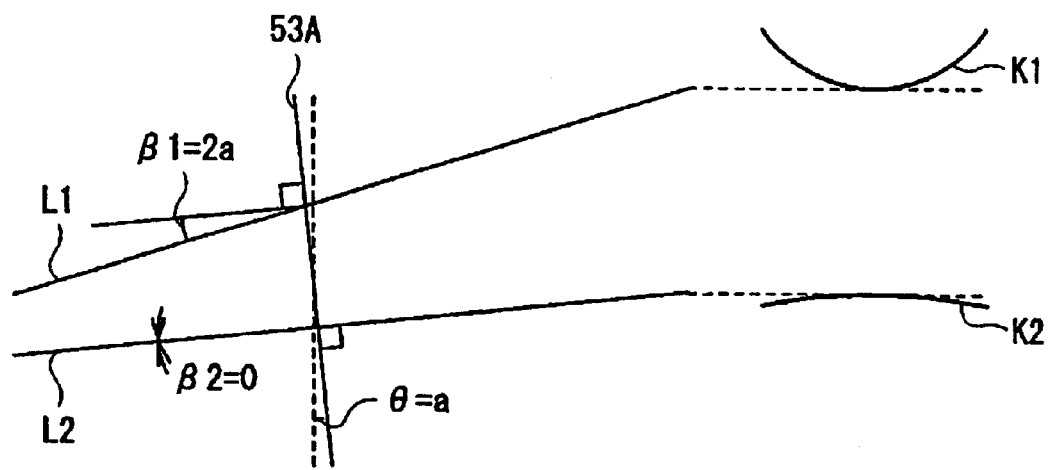
FIGS. 15A–15C show simplified enlarged cross-sectional views of the light incident surface of the cylindrical lens of FIG. 13 but with the cylindrical lens inclined at different angles.
Figure 15B:
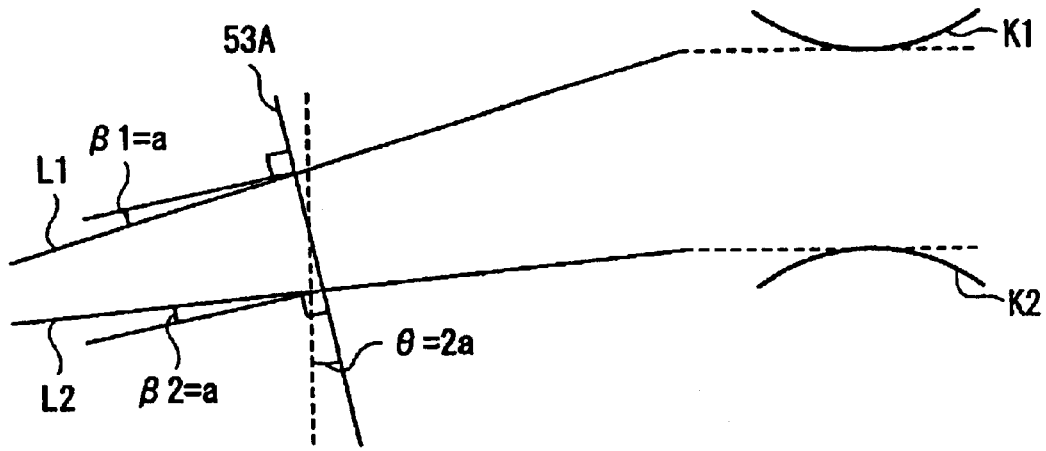
Figure 15C:
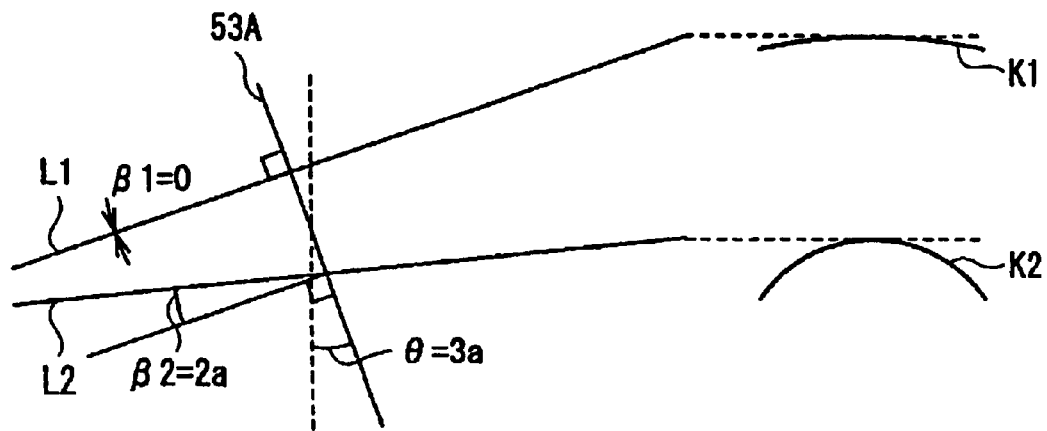
Figure 16A:
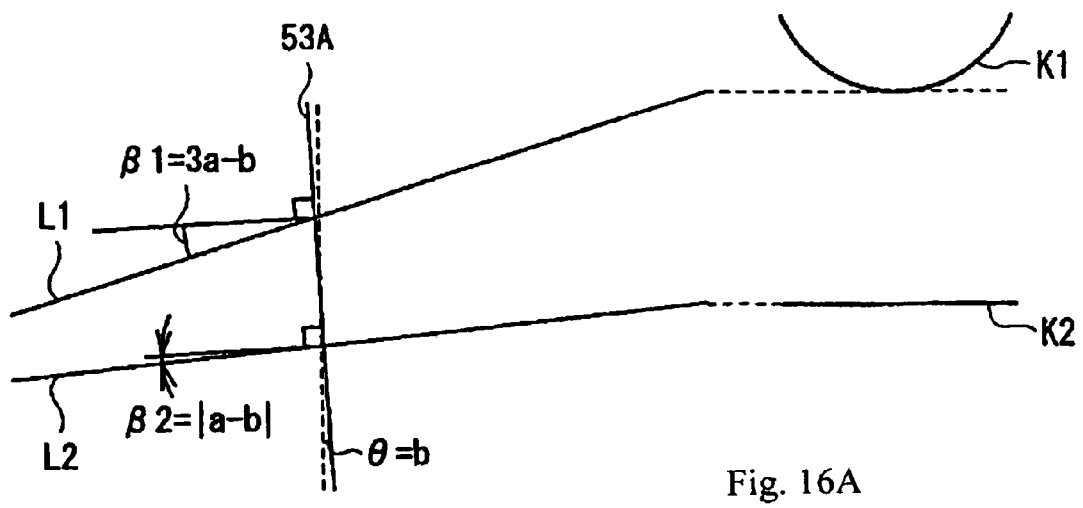
FIGS. 16A–16C show simplified enlarged cross-sectional views of the light incident surface of the cylindrical lens of FIG. 13 but with the cylindrical lens inclined at angles different from those of FIGS. 15A–15C.
Figure 16B:
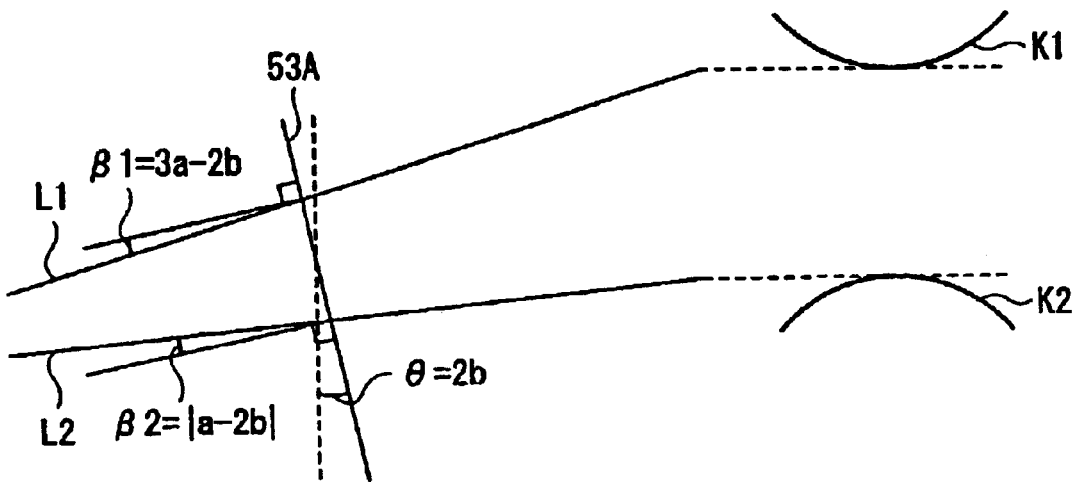
Figure 16C:
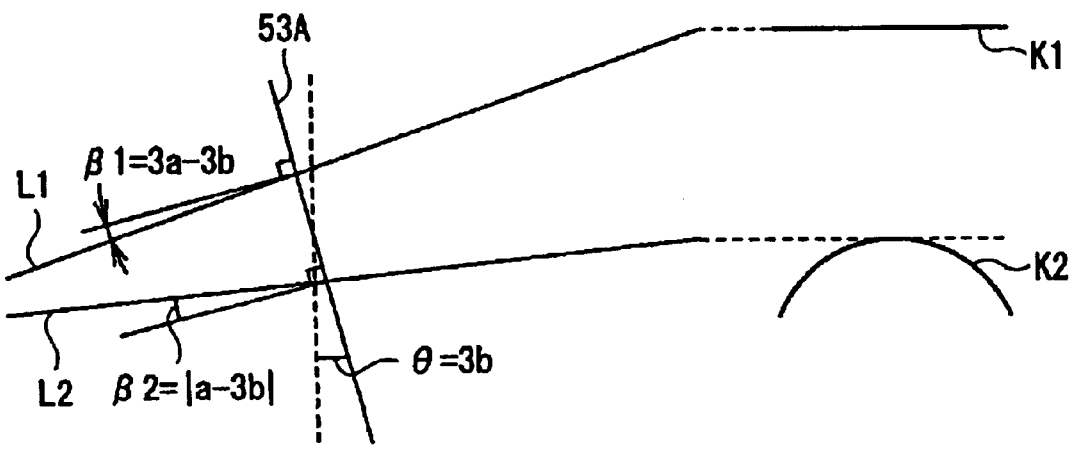

FIGS. 15A–15C show simplified enlarged cross-sectional views of the light incident surface of the fourth cylindrical lens 52 of FIG. 13 but with the cylindrical lens 52 inclined at different angles. FIGS. 16A–16C show simplified enlarged cross-sectional views of the light incident surface of the cylindrical lens of FIG. 13 but with the cylindrical lens inclined at angles different from those of FIGS. 15A–15C. FIGS. 15A–15C and FIGS. 16A–16C also show variations in curvature of the scanning lines on the imaginary surface 57 immediately after the first lens part 52A in accordance with inclinations of the first lens part 52A, including incident surface 53A, of the fourth cylindrical lens 52. For a simplified explanation, the original incident angles $\alpha$1 and $\alpha$2 of FIG. 10A are assumed to be "3$a$" and "$a$" in FIGS. 15A–15C and FIGS. 16A–16C.

FIG. 15A shows the case in which the inclination angle $\theta$ of the first lens part 52A is "$a$." In this case, the incident angle $\beta$1 of the light beam L1 at the incident surface 53A of the first lens part 52A is "2$a$" and the incident angle $\beta$2 of the light beam L2 is zero. The light beam L2 enters at a right angle in the plane including the second direction. The scanning line K2 is subject to the curvature that occurs when the light beam L2 passes through the third cylindrical lens 51 obliquely. The third cylindrical lens 51 has a negative refractive power in the first direction. Therefore, the scanning line K2 has an opposite direction of curvature to the scanning line K1, as indicated in FIG. 15A.

FIG. 16A shows a case in which the inclination angle $\theta$ of the first lens part 52A is "$b$" which is slightly smaller than "$a$." As shown in FIG. 16A, with the inclination angle being "$b$," the third cylindrical lens 51 and the fourth cylindrical lens 52 produce the scanning line curvatures equal in magnitude but opposite in direction so that the curvatures cancel each other, preventing curvature in the scanning line K2. This eliminates the need of a cover glass for the light beam L2, which otherwise may be used for correcting the curvature, as described later. Here, the light beam L1 still produces a curved scanning line K1. Its curvature is smaller than the case in which the first lens part 52A is not inclined (as shown in FIG. 6A). As shown in FIGS. 16A–16C, as the inclination angle $\theta$ increases from $\theta$ equals b to $\theta$ equals 3$b$, the curvature of K1 decreases. Thus, inclining the fourth cylindrical lens moderates the correction factor for curvature required of a cover glass, as will be described later.

FIG. 15B shows the case in which the inclination angle $\theta$ of the first lens part 52A is "2$a$." In this case, both of the incident angles of the light beams L1 and L2 to the incident surface 53A of the first lens part 52A are "$a$." Both the light beams L1 and L2 produce the curved scanning lines K1 and K2. However, their curvature is much smaller than the scanning line K1 when the incident angle $\beta$1 equals 2$a$ as shown in FIG. 15A.

As shown in FIG. 16B, when the inclination angle $\theta$ is "2$b$," which is double the "$b$" that produces zero curvature in the scanning line K2, the scanning lines K1 and K2 have curvatures opposite in direction but nearly the same in magnitude. This moderates the correction factors for curvature by the cover glasses, described later, compared with the scanning line K1 in FIG. 15A. Furthermore, the same correction factors in absolute value facilitates the correction.

FIG. 15C shows the case in which the inclination angle $\theta$ of the first lens part 52A is "3$a$." In this case, the incident angle $\beta$2 of the light beam L2 to the incident surface 53A of the first lens part 52A is "2$a$" and the incident angle $\beta$1 of the light beam L1 is zero. The light beam L1 enters at a right angle in the plane including the second direction. The scanning line K1 is subject to the curvature that occurs when the light beam L1 passes through the third cylindrical lens 51 obliquely.

FIG. 16C shows the case in which the inclination angle $\theta$ of the first lens part 52A is "3$b$." As shown in FIG. 16C, with the inclination angle being "3$b$", the third cylindrical lens 51 and the fourth cylindrical lens 52 produce scanning line curvatures that are equal in magnitude but opposite in direction so that they cancel each other, thereby preventing curvature of the scanning line K1. This eliminates the need for a cover glass for the light beam L1, as will be described later. Here, the light beam L2 still produces a curved scanning line K2. Its curvature is larger than the case in which the first lens part 52A is not inclined (as shown in FIG. 6A).

FIGS. 15A–15C and FIGS. 16A–16C refer to the two light beams L1 and L2. However, the same explanations above apply to the scanning lines K3 and K4 of the bottom two light beams L3 and L4. That is, the descriptions based on FIGS. 15A–15C and FIGS. 16A–16C may be generalized as follows. The inclination angle $\theta$ of the first lens part 52A is such that the scanning line curvature of one of the light beams L1 and L2 caused by the fourth cylindrical lens 52 and the scanning line curvature of the one of the light beams L1 and L2 caused by the third cylindrical lens 51 are equal in magnitude but opposite in direction. The same is true for the light beams L3 and L4. This makes one of the scanning lines of the light beams L1 and L2 (i.e., K1 or K2) and one of the scanning lines of the light beams L3 and L4 (i.e., K3 or K4) linear. Then, a further correction for curvature is necessary only for the remaining nonlinear scanning lines, and in fact may make further correction of scanning lines for curvature in the optical system following the fourth cylindrical lens 52 unnecessary.

Figure 17A:
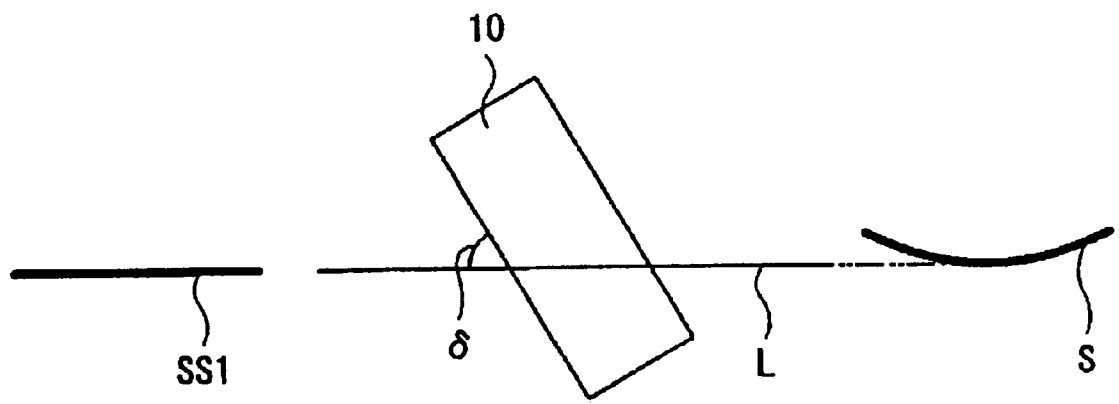
FIGS. 17A–17C show cross-sectional views of a cover glass at various inclinations for changing the curvature of the scanning lines.
Figure 17B:
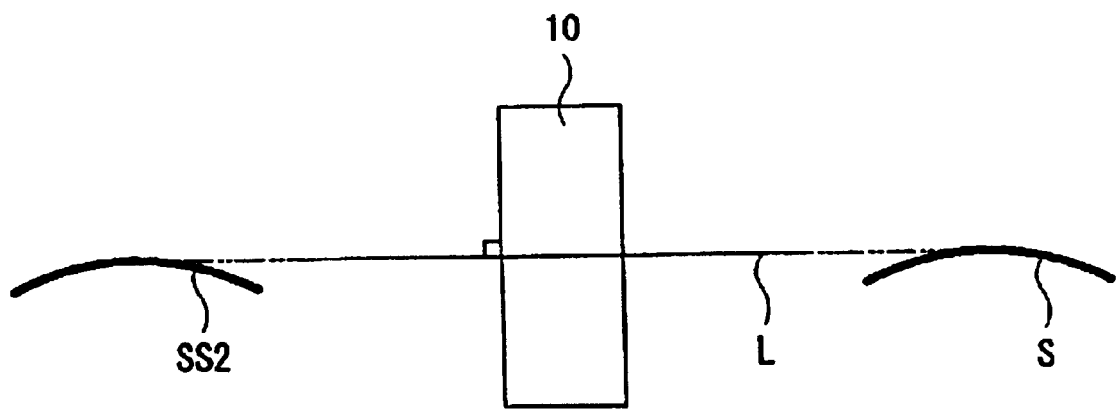
Figure 17C:
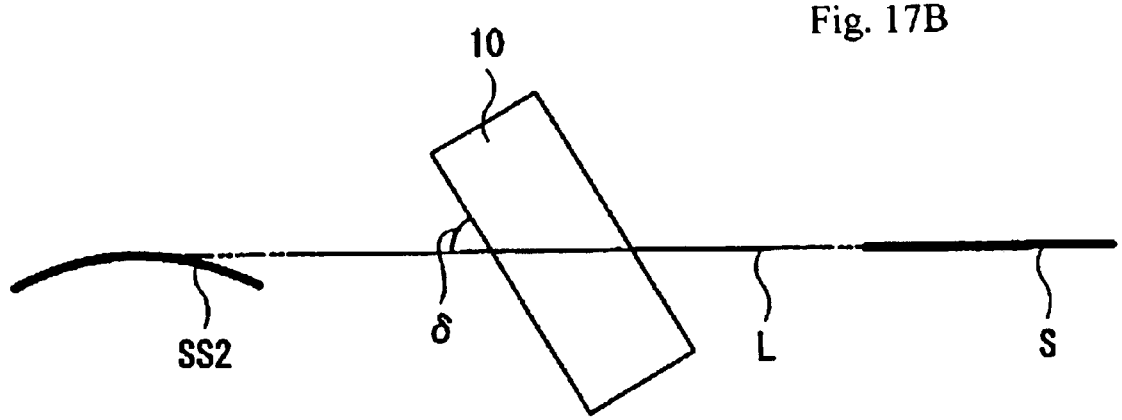

FIGS. 17A–17C show cross-sectional views of a cover glass 10 at various inclinations changing the curvature of the scanning lines. The cover glass 10 represents cover glasses 10A–10D that may be considered for correcting the scanning line curvature caused by the fourth cylindrical lens 52. In FIGS. 17A–17C, the light beam L represents the light beams L1 to L4 generally, and the scanning line S represents scanning lines S1 to S4 generally.

As shown in FIG. 17A, it is assumed that the light beam L produces a straight scanning line SS1 after it is reflected by one of the cylindrical mirrors 6A to 6D. In such a case, after passing through the cover glass 10 inclined by an angle δ in relation to the direction orthogonal to it, the light beam L produces a curved scanning line S on the scanned surface 7 depending on the inclination angle δ and its direction.

As shown in FIG. 17B, it is assumed that the light beam L produces a curved scanning line SS2 after it has been reflected by one of the cylindrical mirrors 6A to 6D. In such a case, after passing through the cover glass 10 provided orthogonal to it, the light beam L produces a curved scanning line S on the scanned surface 7.

As shown in FIG. 17C, it is assumed that the light beam L produces a curved scanning line SS2 after it is reflected by one of the cylindrical mirrors 6A to 6D and the light beam passes through the cover glass 10 inclined by 6 in relation to the direction orthogonal to the light beam L. In such a case, as is apparent from the discussion with FIGS. 17A and 17B, the curvature of the scanning line SS2 before the cover glass 10 is canceled by the opposite curvature caused by the cover glass 10. Thus, the final scanning line S on the scanned surface 7 is nearly linear.

The principle above is adapted to correct the curvature of the scanning lines on the scanned surface 7. As shown in FIGS. 6B, 7B, 8B, and 9B, the cover glasses 10A and 10B are provided in the optical paths of the light beams L1 and L2 and inclined so that curvatures introduced in the scanning lines of the light beams L1 and L2 are corrected. The curvatures introduced in the scanning lines of the light beams L1 and L2 are canceled by the cover glasses 10A and 10B so that straight scanning lines S1 and S2 can be obtained on the scanned surface 7.

As described above, the light beams L1 to L4 reflected by the reflecting surface 41 of the polygon mirror 4 enter the following separation optical system with their separations progressively increasing in the second direction. This can reduce the acceptable width 41D in the second direction of the reflecting surface 41. Thus, the polygon mirror 4 has a smaller thickness in the second direction, which enables making the polygon mirror 4 lighter. This, in turn, enables higher speed rotation of the polygon mirror, which leads to higher printing speeds.

In the disclosed embodiments of the present invention, the first lens group of the second optical system 3 includes a first cylindrical lens 31A that has a negative refractive power in the first direction and a spherical lens 31B that has a positive refractive power. This helps reduce the distance between the light source 1 and the polygon mirror 4, thus allowing the scanning optical system to be smaller. Additionally, the use of spherical lens 31B that serves both to change the light beam diameters in the first direction and to converge the beams in the second direction helps reduce the number of lens parts in the second optical system 3.

In the disclosed embodiments of the present invention, the fourth cylindrical lens 52 includes first and second lens parts 52A and 52B, respectively, that are adjacent to each other in the second direction. When the first lens part 52A is inclined by an angle θ and the second lens part 52B is inclined by an angle of minus θ the problems associated with the light beams entering the fourth cylindrical lens 52 at larger angles are reduced. In particular, the light beams are subject to the least cross-sectional distortion when the first lens part 52A is inclined so that the absolute value total of the incident angles of the first and second light beams L1 and L2 is smaller than the absolute value total of the incident angles thereof when the first lens part 52A is not inclined, and the second lens part 52B is inclined so that the absolute value total of the incident angles of the third and fourth light beams L3 and L4 is smaller than the absolute value total of the incident angles thereof when the second lens part 52B is not inclined. This can prevent distortion of the shape of the light spots on the scanned surface 7.

With the embodiments of the present invention, one of the scanning lines, S1 or S2, of the light beams L1 and L2 can be linear when the inclination angle θ of the first lens part 53A is determined so that the scanning line curvature caused by the fourth cylindrical lens 52 and the scanning line curvature caused by the third cylindrical lens 51, which depend on the incident angle $\beta 1$ or $\beta 2$ onto the incident surface including the second direction of one of the light beams L1 and L2, are equal in magnitude but opposite in direction. The same is true for the light beams L3 and L4. In such a case, further correction for curvature is necessary for only two of the light beams L1 to L4, thus reducing by one-half the further corrections that are necessary.

In the disclosed embodiments of the present invention, the cover glasses 10A and 10B are provided in the optical path of the light beams L1 and L2. The cover glasses 10A and 10B are inclined in the direction in which they will cancel other curvatures of the scanning lines of the light beams L1 and L2 in order to produce the straight scanning lines S1 and S2. The same is true for the light beams L3 and L4. In that case, all the scanning lines on the scanned surface 7 are linear, providing high quality latent images without distortion.

The invention being thus described, it will be obvious that the same may be varied in many ways. For example, the light source 1 may include other than four light sources, for example, five or more light sources providing five or more light beams. Additionally, although as disclosed the second optical system 3 includes a first lens group with a first cylindrical lens 31A having a negative refractive power in the first direction and a spherical lens 31B having a positive power and a second group with a second cylindrical lens 32 having a negative refractive power in the second direction, the second optical system 3 is not confined to this structure. Furthermore, although as disclosed the third optical system 5 includes a third cylindrical lens 51 having a negative refractive power in the first direction and a fourth cylindrical lens 52 having a positive refractive power in the first direction, the third optical system 5 is not limited to this structure. For example, when the fourth cylindrical lens 52 includes two lens parts, first and second lens parts 52A and 52B as disclosed, the two lens parts can be separate individual lens parts, thus allowing independent adjustment of angular inclinations, or, alternatively, they can be integrated to form a one piece structure as the fourth cylindrical lens 52. Rather, the scope of the invention shall be defined as set forth in the following claims and their legal equivalents. All such modifications as would be obvious to one skilled in the art are intended to be included within the scope of the following claims.

What is claimed is:

1. An optical scanning system for scanning a plurality of light beams on one or more scanned surfaces, the optical scanning system comprising:
a light source for emitting the plurality of light beams;
a front optical system for receiving said plurality of light beams from the light source along an optical axis that extends within the optical scanning system;
a deflector for receiving said plurality of light beams from the front optical system and for deflecting said plurality of light beams in a first direction so that said plurality of light beams scan in said first direction;
a rear optical system for receiving said plurality of light beams from said deflector and for directing said plurality of light beams toward the one or more scanned surfaces so that said plurality of light beams are separated farther in a second direction that is orthogonal to said first direction within said rear optical system than at said deflector; wherein
the plurality of light beams are deflected by the deflector and enter said rear optical system at angles to one another in said second direction so that the separations of the plurality of light beams in said second direction progressively increase as they pass through said rear optical system; and
said front optical system includes a lens group that is adjacent said deflector and that is of negative refractive power at least in said second direction.

2. The optical scanning system of claim 1, wherein:
said front optical system includes, in order from the light source side, a first optical system for collimating each of said plurality of light beams and a second optical system for converging each of said plurality of light beams at least in said second direction.

3. The optical scanning system of claim 2, wherein:
said second optical system includes a first lens group having a positive refractive power at least in said second direction and that is adjacent to and on the light source side of said lens group that is adjacent said deflector.

4. The optical scanning system of claim 3, wherein:
said first lens group includes, in order from the light source side, a first cylindrical lens having a negative refractive power in said first direction and a spherical lens having a positive refractive power;
said second lens group includes a second cylindrical lens having a negative refractive power in said second direction; and
the plurality of collimated light beams produced by said first optical system have widths in said first direction changed by said first lens group, and said spherical lens and said second lens group, together, converge the light beams in the second direction.

5. The optical scanning system of claim 1, wherein:
said rear optical system includes, in order from the light source side, a converging optical system for converging in said first direction each of the plurality of light beams deflected from said deflector, a separation optical system for separating the plurality of light beams in said second direction after they pass through said converging optical system, and a further optical system for converging each of the plurality of light beams at least in the second direction after they pass through said separation optical system.

6. The optical scanning system of claim 5, wherein said converging optical system includes a converging lens group having greater refractive power in said first direction than in said second direction.

7. The optical scanning system of claim 6, wherein said converging lens group includes, in order from the light source side, a cylindrical lens having negative refractive power in said first direction and a cylindrical lens having positive refractive power in said first direction.

8. The optical scanning system of claim 7, wherein:
said cylindrical lens having positive refractive power in said first direction includes first and second lens parts adjacent each other in said second direction;
said first lens part includes a first light source side incident surface that is inclined at a first angle in said second direction relative to said optical axis that extends within the optical scanning system and said second lens part includes a second light source side incident surface that is inclined at a second angle in said second direction relative to said optical axis that extends within the optical scanning system; and
said first angle and said second angle are equal in magnitude and opposite in direction from said optical axis that extends within the optical scanning system.

9. The optical scanning system of claim 8, wherein:
said light source produces four light beams from four locations separated in said second direction, a first two of said four locations being on one side of said optical axis that extends within the optical scanning system and a second two of said four locations being on the other side of said optical axis that extends within the optical scanning system;
said first light source side incident surface is inclined to said optical axis so that the sum of the absolute values of the incident angles in said second direction of the two light beams from said first two of said four locations on said first light source side incident surface is less than the sum of the absolute values, where the first light source side incident surface is normal to the optical axis, of the incident angles in said second direction of said two light beams from said first two of said four locations on said first light source side incident surface; and
said second light source side incident surface is inclined to said optical axis so that the sum of the absolute values of the incident angles in said second direction of the two light beams from said second two of said four locations on said second light source side incident surface is less than the sum of the absolute values, where the second light source side incident surface is normal to the optical axis, of the incident angles in said second direction of said two light beams from said second two of said four locations on said second light source side incident surface.

10. The optical scanning system of claim 8, wherein said first angle and second angle are chosen so that said first lens part and said second lens part contribute to curvatures of scanning lines that may compensate for curvatures of the scanning lines introduced by other optical elements of the optical scanning system.

11. The optical scanning system of claim 8, wherein said first angle and second angle are chosen so that each of said first lens part and said second lens part may contribute to curvature of scanning lines so that each of said first lens part and said second lens part may fully compensate for the curvature of at least one scanning line.

12. The optical scanning system of claim 8, wherein said first angle and second angle are chosen so that each of said first lens part and said second lens part may contribute to curvatures of scanning lines so that each of said first lens part and said second lens part may change the curvatures of two scanning lines associated with two light beams from being unequal to being equal.

13. The optical scanning system of claim 9, wherein said first lens part and said second lens part contribute to curvatures of scanning lines that compensate for curvatures of the scanning lines.

14. The optical scanning system of claim 9, wherein each of said first lens part and said second lens part contribute to curvatures of scanning lines so that said first lens part fully compensates for the curvature of at least one scanning line associated with one of said two light beams from said first two of said four locations and said second lens part fully compensates for the curvature of at least one scanning line associated with one of said two light beams from said two of said four locations.

15. The optical scanning system of claim 9, wherein each of said first lens part and said second lens part contribute to curvature of scanning lines so that each of said first lens part and said second lens part change the curvatures, of two scanning lines associated with said two light beams from said first location and two scanning lines associated with said two light beams from said second location, from being unequal to being equal.

16. The optical system of claim 5, wherein said converging optical system includes a cylindrical mirror having refractive power at least in said second direction.

17. The optical system of claim 1 including a plurality of scanned surfaces, wherein said scanned surfaces include a plurality of photosensitive surfaces on which images are formed by scanning said plurality of light beams.

18. The optical system of claim 5 including a plurality of scanned surfaces, wherein said scanned surfaces include a plurality of photosensitive surfaces on which images are formed by scanning said plurality of light beams.

19. The optical system of claim 8 including a plurality of scanned surfaces, wherein said scanned surfaces include a plurality of photosensitive surfaces on which images are formed by scanning said plurality of light beams.

20. The optical system of claim 9 including a plurality of scanned surfaces, wherein said scanned surfaces include a plurality of photosensitive surfaces on which images are formed by scanning said plurality of light beams.

* * * * *

UNITED STATES PATENT AND TRADEMARK OFFICE
CERTIFICATE OF CORRECTION

PATENT NO. : 6,717,704 B2
DATED : April 6, 2004
INVENTOR(S) : Nakai

It is certified that error appears in the above-identified patent and that said Letters Patent is hereby corrected as shown below:

Column 8,
Line 44, change "FIGS. 5A - 5A" to -- FIGS. 5A - 5B --;

Column 10,
Line 53, change "total $|\alpha 1 + |\alpha 2|$ of" to -- total $|\alpha 1|+ |\alpha 2|$ of --;

Column 12,
Line 61, change "lanes" to -- lines --;

Column 14,
Line 63, change "of the one" to -- of one --;

Column 15,
Line 30, change "by 6" to -- by $\delta$ --; and
Line 55, change "speed rotation" to -- rotation speed --.

Signed and Sealed this

Twenty-sixth Day of October, 2004

JON W. DUDAS
*Director of the United States Patent and Trademark Office*